United States Patent
Brown et al.

(10) Patent No.: US 11,170,316 B2
(45) Date of Patent: Nov. 9, 2021

(54) SYSTEM AND METHOD FOR DETERMINING FUZZY CAUSE AND EFFECT RELATIONSHIPS IN AN INTELLIGENT WORKLOAD MANAGEMENT SYSTEM

(71) Applicant: Micro Focus Software Inc., Wilmington, DE (US)

(72) Inventors: Jeremy Ray Brown, Bluffdale, UT (US); Jason Allen Sabin, Lehi, UT (US); Nathaniel Brent Kranendonk, Springville, UT (US); Kal A. Larsen, Springville, UT (US); Lloyd Leon Burch, Payson, UT (US); Michael Fairbanks, Lindon, UT (US); Michael John Jorgensen, Mapleton, UT (US); Thomas Larry Biggs, Payson, UT (US)

(73) Assignee: Micro Focus Software Inc., Wilmington, DE (US)

( * ) Notice: Subject to any disclaimer, the term of this patent is extended or adjusted under 35 U.S.C. 154(b) by 835 days.

(21) Appl. No.: 15/948,621

(22) Filed: Apr. 9, 2018

(65) Prior Publication Data
US 2018/0225584 A1    Aug. 9, 2018

Related U.S. Application Data

(63) Continuation of application No. 14/141,738, filed on Dec. 27, 2013, now Pat. No. 9,965,724, which is a
(Continued)

(51) Int. Cl.
*G06N 7/02* (2006.01)
*G06N 5/04* (2006.01)
*G06Q 10/06* (2012.01)

(52) U.S. Cl.
CPC ............... *G06N 7/02* (2013.01); *G06N 5/048* (2013.01); *G06Q 10/0633* (2013.01)

(58) Field of Classification Search
None
See application file for complete search history.

(56) References Cited

U.S. PATENT DOCUMENTS

| 5,572,629 | A  | 11/1996 | Choi    |
| 6,446,054 | B1 | 9/2002  | Mayorga |

(Continued)

OTHER PUBLICATIONS

U.S. Appl. No. 12/952,314 U.S. Pat. No. 8,620,851, filed Nov. 23, 2010, System and Method for Determining Fuzzy Cause and Effect Relationships in an Intelligent Workload Management System.
(Continued)

*Primary Examiner* — Alan Chen
(74) *Attorney, Agent, or Firm* — Schwegman Lundberg & Woessner, P.A.

(57) ABSTRACT

The system and method for determining fuzzy cause and effect relationships in an intelligent workload management system described herein may combine potential causes and effects captured from various different sources associated with an information technology infrastructure with substantially instantaneous feedback mechanisms and other knowledge sources. As such, fuzzy correlation logic may then be applied to the combined information to determine potential cause and effect relationships and thereby diagnose problems and otherwise manage interactions that occur in the infrastructure. For example, information describing potential causes and potential effects associated with an operational state of the infrastructure may be captured and combined, and any patterns among the information that describes the multiple potential causes and effects may then be identified. As such, fuzzy logic may the be applied to any such patterns to determine possible relationships among the
(Continued)

potential causes and the potential effects associated with the infrastructure operational state.

20 Claims, 4 Drawing Sheets

Related U.S. Application Data continuation of application No. 12/952,314, filed on Nov. 23, 2010, now Pat. No. 8,620,851.

(56) References Cited

U.S. PATENT DOCUMENTS

| | | | |
|---|---|---|---|
| 6,895,585 | B2 | 5/2005 | Smith |
| 7,280,988 | B2 | 10/2007 | Helsper et al. |
| 7,395,187 | B2 | 7/2008 | Duyanovich et al. |
| 7,600,007 | B1 | 10/2009 | Lewis |
| 7,797,347 | B2 | 9/2010 | Draese et al. |
| 8,543,916 | B2 * | 9/2013 | Anderson ............... G06F 9/455 715/704 |
| 8,620,851 | B2 | 12/2013 | Brown et al. |
| 2003/0150909 | A1 | 8/2003 | Markham et al. |
| 2004/0068431 | A1 | 4/2004 | Smith et al. |
| 2005/0043961 | A1 | 2/2005 | Torres et al. |
| 2006/0133412 | A1 | 6/2006 | Callaghan |
| 2007/0055771 | A1 | 3/2007 | Tantawi et al. |
| 2007/0130231 | A1 | 6/2007 | Brown et al. |
| 2008/0082857 | A1 | 4/2008 | Meijer et al. |
| 2009/0109860 | A1 * | 4/2009 | Cinato ................ H04L 41/0677 370/242 |
| 2009/0276388 | A1 | 11/2009 | Donohue |
| 2011/0125895 | A1 * | 5/2011 | Anderson .......... H04L 63/0815 709/224 |
| 2011/0302295 | A1 * | 12/2011 | Westerfeld ................ G06F 8/71 709/224 |
| 2012/0130936 | A1 | 5/2012 | Brown et al. |
| 2012/0290613 | A1 | 11/2012 | Oku |
| 2014/0143200 | A1 | 5/2014 | Brown et al. |
| 2014/0237550 | A1 * | 8/2014 | Anderson ............... H04L 63/14 726/3 |
| 2016/0196375 | A1 * | 7/2016 | Nasle ...................... G06F 17/10 703/18 |
| 2016/0239377 | A1 * | 8/2016 | Hooks ................. G06F 11/3006 |

OTHER PUBLICATIONS

U.S. Appl. No. 14/141,738, filed Dec. 27, 2013, System and Method for Determining Fuzzy Cause and Effect Relationships in an Intelligent Workload Management System.

U.S. Appl. No. 12/952,314, Non Final Office Action dated Mar. 7, 2013, 13 pgs.

U.S. Appl. No. 12/952,314 , Response filed Jun. 7, 2013 to Non Final Office Action dated Mar. 7, 2013, 8 pgs.

U.S. Appl. No. 12/952,314, Notice of Allowance dated Aug. 21, 2013, 6 pgs.

U.S. Appl. No. 14/141,738, Preliminary Amendment filed Jan. 31, 2014, 7 pgs.

U.S. Appl. No. 14/141,738, Non Final Office Action dated Mar. 28, 2016, 14 pgs.

U.S. Appl. No. 14/141,738, Response filed Jun. 28, 2016 to Non Final Office Action dated Mar. 28, 2016, 7 pgs.

U.S. Appl. No. 14/141,738, Final Office Action dated Dec. 12, 2016, 15 pgs.

U.S. Appl. No. 14/141,738, Response filed Feb. 13, 2017 to Final Office Action dated Dec. 12, 2016, 8 pgs.

U.S. Appl. No. 14/141,738, Advisory Action dated Mar. 30, 2017, 2 pgs.

U.S. Appl. No. 14/141,738, Notice of Allowance dated Jan. 2, 2018, 6 pgs.

"A Blueprint for Better Management from the Desktop to the Data Center", White Paper. Novell, Inc., (Feb. 2007), 17 pgs.

"Automation for the New Data Center", Novell, Inc; Technical White Paper, (2006), 11 pgs.

"Google Wave API Overview—Google Wave API—Google Code", [Online]. Retrieved from the Internet: <http://code.google.com/apis/wave/guide.html>, (2009), 3 pgs.

"Novell® Architectural Foundation: A Technical Vision for Computing and Collaborating with Agility.", White paper, (Jan. 23, 2009), 61 pgs.

Lassen, Soren, et al., "Google Wave Federation Architecture", licensed under the Creative Commons Attribution 3.0 License, [Online]. Retrieved from the Internet: <http://www.waveprotocol.org/whitepapers/google-wave-architecture>, 6 pgs.

* cited by examiner

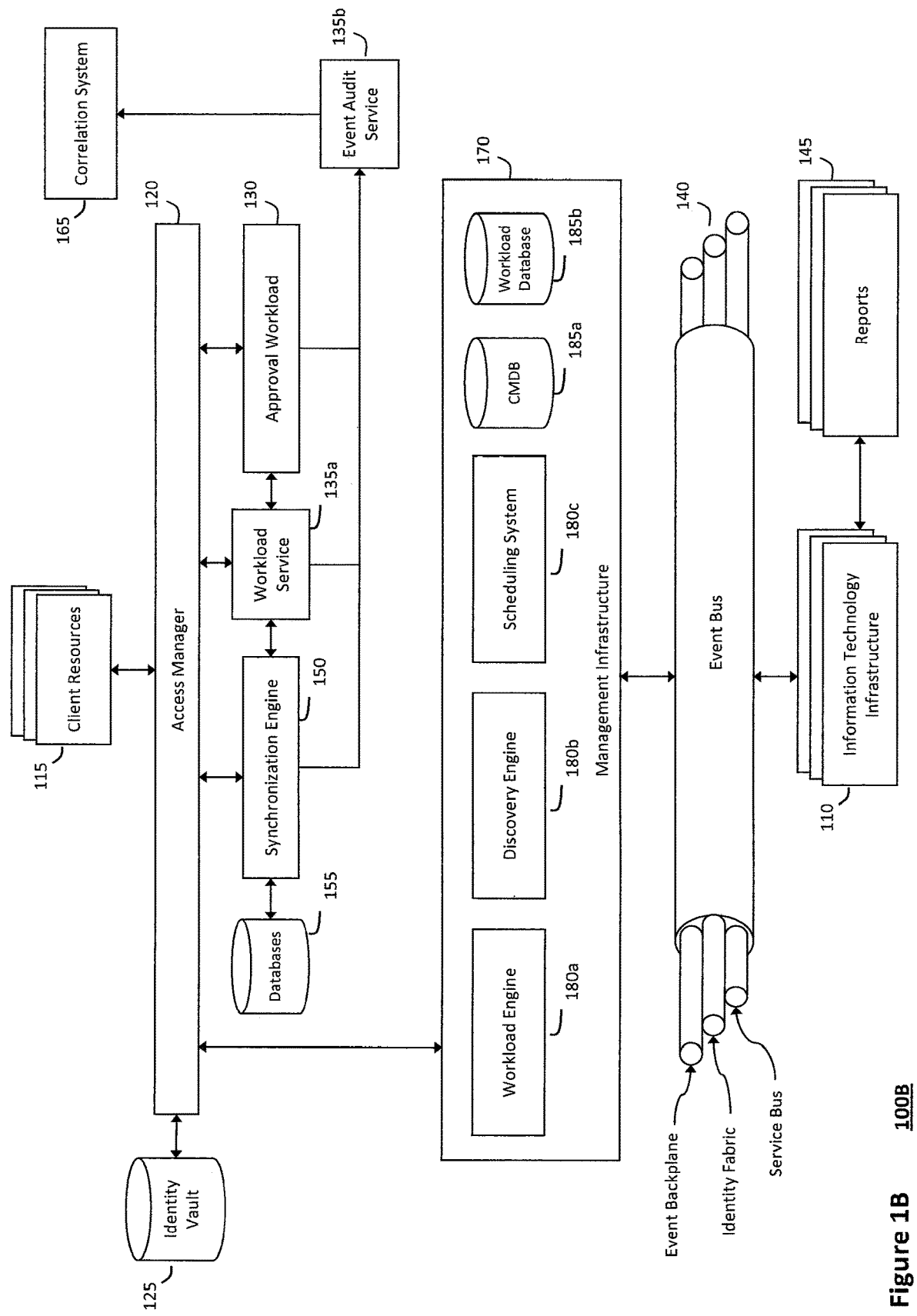
Figure 1B    100B

SYSTEM AND METHOD FOR DETERMINING FUZZY CAUSE AND EFFECT RELATIONSHIPS IN AN INTELLIGENT WORKLOAD MANAGEMENT SYSTEM

RELATED APPLICATIONS

The present application is a continuation of application Ser. No. 14/141,738, which will issue as U.S. Pat. No. 9,965,724 on May 8, 2018 and which was filed on Dec. 27, 2013 and which was a continuation of application Ser. No. 12/952,314 that issued as U.S. Pat. No. 8,620,852 on Dec. 31, 2013 and which was filed on Nov. 23, 2010 and entitled: "System and Method for Determining Fuzzy Cause and Effect Relationships in an Intelligent Workload Management System;" the disclosures of which are incorporated in its entirety herein.

FIELD OF THE INVENTION

The invention generally relates to a system and method for determining fuzzy cause and effect relationships in an intelligent workload management system, and in particular, to combining potential causes and effects captured from various different sources with substantially instantaneous feedback mechanisms and other knowledge sources and applying fuzzy correlation logic to determine cause and effect relationships that can be used to diagnose problems and other interactions associated with an information technology infrastructure.

BACKGROUND OF THE INVENTION

Many current efforts ongoing within the information technology community include considerable interest in the concept of "intelligent workload management." in particular, much of the recent development in the information technology community has focused on providing better techniques to intelligently manage "cloud" computing environments, which generally include dynamically scalable virtualized resources that typically provide network services. For example, cloud computing environments often use virtualization as the preferred paradigm to host workloads on underlying physical hardware resources. For various reasons, computing models built around cloud or virtualized data centers have become increasingly viable, including cloud infrastructures can permit information technology resources to be treated as utilities that can be automatically provisioned on demand. Moreover, cloud infrastructures can limit the computational and financial cost that any particular service has to the actual resources that the service consumes, while further providing users or other resource consumers with the ability to leverage technologies that could otherwise be unavailable. Thus, as cloud computing and storage environments become more pervasive, many information technology organizations will likely find that moving resources currently hosted in physical data centers to cloud and virtualized data centers can yield economies of scale, among other advantages.

Nonetheless, although many efforts in the information technology community relates to moving towards cloud and virtualized computing environments, existing systems tend to fall short in providing adequate solutions that can manage or control such environments. For example, cloud computing environments are generally designed to support generic business practices, meaning that individuals and organizations typically lack the ability to change many aspects of the platform. Moreover, concerns regarding performance, latency, reliability, and security can present significant challenges because outages and downtime often lead to lost business opportunities and decreased productivity, while the generic platform may present governance, risk, and compliance concerns. In other words, once organizations deploy workloads beyond data center boundaries, the lack of visibility into the computing environment that hosts the workloads may result in significant management problems. In this context, the most difficult problem with managing a data center relates to troubleshooting, especially because client devices tend to lack visibility into virtualized and cloud data centers that may be needed to identify particular machines delivering content to the client devices, while servers lack the visibility needed to identify the content being delivered to client devices without implementing custom logging techniques for every delivering application.

Moreover, the interaction between various workloads typically extends beyond the servers or other systems that exercise the workloads because a management infrastructure needs to have knowledge relating to every aspect in the managed environment, including what experiences are occurring on every level within the managed environment. For example, many business service management products that currently attempt to diagnose or troubleshoot problems in an information technology infrastructure tend to monitor a few levels within the managed environment and audit or track certain actions in the managed environment where the problems may be occurring. As such, because business service management technology currently used in the information technology industry primarily works only on problem causes, business service management technology currently in use typically ignores or rarely combines causes with potential effects to make intelligent management decisions. In particular, because the current technology tends to limit visibility into the managed environment to certain monitored levels and audited actions, the existing approaches to diagnosing or troubleshooting problems in an information technology infrastructure usually experience substantial problems when the infrastructure does not work as expected.

For example, a common problem that may occur in an information technology infrastructure relates to a user experiencing degraded performance for a particular service (e.g., slow e-mail response time through a web-based client). Historically, the user would contact help desk personnel, who then spends several minutes gathering information to create a trouble ticket to resolve the problem. In many cases, the ticket will not even be looked at until some time later (if at all), and any diagnostic efforts that then occur would then focus on checking certain monitors and glaring problems in the system that may be contributing to the reported problem. Accordingly, due to the limited information considered in the diagnostic efforts, many reported problems will have little or no useful information returned, with the problem ticket repeatedly bouncing back and forth between the user, help desk personnel, and other entities, with the ticket often eventually being closed because the problem could not be diagnosed. In other words, unless the help desk personnel are able to see that a substantial issue may be contributing the problem (e.g., the e-mail server went down), the lack of visibility that existing systems have into the infrastructure can result in nothing being resolved because existing systems lack the knowledge needed to correlate the problem with other potentially contributing problems. Accordingly, although existing systems have attempted to provide solutions that can troubleshoot and gather management data to diagnose issues in an information technology infrastructure, the solutions that have been proposed tend to fall short in providing techniques that can suitably capture and combine all potential causes and effects with instant feedback and other information sources to obtain more details around what may be happening in the infrastructure.

SUMMARY OF THE INVENTION

According to one aspect of the invention, the system and method described herein may determine fuzzy cause and effect relationships in an intelligent workload management system. In particular, the system and method described herein may generally operate in a computing environment having a fluid architecture, whereby the computing environment may create common threads that converge information relating to user identities and access credentials, provisioned and requested services, and physical and virtual infrastructure resources, among other things. As such, the system and method described herein may use the information converged in the common threads to provide visibility into various load balancers that may be used to manage workloads in the intelligent workload management system (alternatively referred to herein as "the workload management system"). For example, the workload management system may provide various services that aggregate physical and/or virtualized resources, while applications provided in the workload management system may aggregate various services and workloads that compose whole services, separate services, and sub-services that can work together. For example, the workload management system may manage workloads that can provision tuned appliances configured to perform particular functions or host particular applications, wherein to manage the workloads, the workload management system may create resource stores that point to storage locations for the appliances, declare service level agreements and runtime requirements that constrain the appliances, obtain certificates or attestation tokens that certify compliance with the service level agreements or other runtime requirements, and create profiles that provide audit trails describing actual lifecycle behavior for the appliances.

According to one aspect of the invention, the system and method described herein may operate in a model-driven architecture, which may merge information relating to user identities with services that may be running in an information technology infrastructure. As such, the information merged in the model-driven architecture may be referenced to determine specific users or organizational areas within the infrastructure that may be impacted in response to a particular change to the infrastructure model. Thus, the model-driven architecture may track contexts associated with information technology workloads from start to finish, which may provide the audit trails that can then be referenced to identify relevant users, applications, systems, or other entities that can assist with particular issues. Moreover, to manage workloads that provide virtualized services, where different users typically need the ability to communicate with one another on-demand, the audit trails created in the model-driven architecture may track end-to-end workload activities and thereby provide visibility and notice to users, applications, systems, services, or any other suitable entities that the workloads may impact. Furthermore, the workload management system may operate in a service-oriented architecture that can unify various heterogeneous technologies, whereby the workload management system may enable the agility and flexibility needed to have an information technology infrastructure move at the speed of modern business. In particular, the service-oriented architecture may provide adaptable and interoperable information technology tools that can address many business challenges that information technology organizations typically face. For example, the model-driven architecture may provide various virtualization services to create manageable workloads that can be moved efficiently throughout the infrastructure, while the service-oriented architecture may merge different technologies to provide various coordinated and cooperating systems that can optimally execute distributed portions of an overall orchestrated workload. As such, the model-driven and service-oriented architectures may collectively derive data from the information technology infrastructure, which may inform intelligent information technology choices that meet the needs of businesses and users.

According to one aspect of the invention, to determine the fuzzy cause and effect relationships in the workload management system, the system and method described herein may dynamically allocate physical resources to host orchestrated virtual machines that run applications and services supporting infrastructure workloads, which may enable a distributed and virtualized data center that can record any suitable collaborative information technology process. For example, a management infrastructure may continually monitor an information technology infrastructure to record streams of events that represent collaborative information technology processes. In particular, one or more wave data structures may record time-ordered event streams that capture conversational interactions that occur between managed entities in the infrastructure, wherein the conversational interactions may include virtual team members collaboratively interacting with content, communicating with other members of the virtual team, or performing any other suitable information technology process in the infrastructure. The information technology processes recorded in the wave data structures may therefore be continually captured in a time-ordered event stream, which may subsequently be replayed to visualize an evolution of the event stream recorded therein. Furthermore, the wave data structures may be stored and subsequently referenced to remediate, roll back, or otherwise analyze the collaborative information technology processes recorded therein, wherein the wave data structures may be used to guide subsequent information technology processes that may be relevant to the information recorded in the wave data structures.

According to one aspect of the invention, to determine the fuzzy cause and effect relationships in the workload management system, the system and method described herein may provide visibility into the infrastructure to assist resolving certain problems or otherwise managing the infrastructure. For example, a discovery engine may obtain potential causes and potential effects from the infrastructure, an identity vault, a configuration management database, or any other suitable source that may provide input information relating to potential causes and effects in the infrastructure. In one implementation, a fuzzy cause and effect engine may then combine the potential causes and effects with manual tuning parameters and substantially instantaneous feedback mechanisms that may be used to determine relationships between the potential causes and the potential effects. Thus, as will be described in further detail herein, the fuzzy cause and effect engine may analyze the potential causes, the potential effects, the manual tuning parameters, and any other substantially instantaneous feedback mechanisms or knowledge about the infrastructure to troubleshoot or otherwise manage any suitable problem or other interaction in the information technology infrastructure, thereby allowing users, administrators, or other suitable human or automated entities to obtain or provide additional details describing what may be happening in the infrastructure in order to troubleshoot or otherwise manage the infrastructure.

According to one aspect of the invention, to determine the fuzzy cause and effect relationships in the workload management system, the system and method described herein may integrate various input sources that can provide knowledge or enable collaborative interactions to determine cause and effect relationships in the infrastructure and thereby diagnose or manage the infrastructure. For example, in one implementation, the input information may be broken down into potential causes and potential effects, wherein the potential causes may obtained from various applications, products, or other technologies that provide auditing, logging, and account access tracking services, while the potential effects may be captured from various applications, products, or other technologies that provide identity, monitoring, and message services. Furthermore, the identity services may provide input information to build the potential effects to provide managed identities associated with the applications, products, and other technologies that provide the auditing, logging, account access tracking, monitoring, and messaging services. Accordingly, the identity services may generally ensure that the fuzzy cause and effect engine will have knowledge describing any identities that the services delivering content in the workload management system may have in the infrastructure in order to determine relationships between the potential causes and the effects. Moreover, the identity services may provide a standard mechanism to represent data from various potentially diverse sources that deliver the input information to the fuzzy cause and effect engine, which may enable the fuzzy cause and effect engine to analyze the input information without having to handle different authentication credentials used in the diverse sources that deliver the input information to the fuzzy cause and effect engine.

According to one aspect of the invention, to determine the fuzzy cause and effect relationships in the workload management system, the system and method described herein may control various settings, constraints, and other parameters that configure the fuzzy logic and other analytics that the fuzzy cause and effect engine uses to determine whether any of the relationships exist among the potential causes and effects. For example, the configurations may include time periods that define intervals to control events that the fuzzy cause and effect engine will capture from the potential causes and effects to generate true or false calculations indicating whether any relationships exist among the events captured from the potential causes and effects. In one implementation, the relevant time periods may be predefined, based on characteristics associated with a particular problem or interaction, or manually tuned to increase or decrease the time periods and thereby to provide flexibility in determining a time window that may include events relevant to determining the relationships. Additionally, the configurations may define a system associated with the current problem or interaction to provide understanding about how certain components or resources may be affecting one another, and may include appropriate parameters that define sizes associated with a cause bucket and an effect bucket that store the events captured from the potential causes and the potential effects.

According to one aspect of the invention, to determine the fuzzy cause and effect relationships in the workload management system, the system and method described herein may build an authoritative map that represents the system associated with the current problem or interaction in response to suitably configuring the fuzzy cause and effect engine. For example, the authoritative map may generally include various keywords mapped to various categories, services, or other information that suitably represents the system associated with the current problem or interaction, wherein the information used to configured the fuzzy cause and effect engine may generally control building the authoritative map from the potential effects. In one implementation, the authoritative map may represent the keywords mapped to the categories or services at any suitable granularity level, whereby the authoritative map may substantially simplify any complexity in the information that defines the system associated with the current problem or interaction with the granular levels used to represent the keywords mapped to the categories or services. To build the relationships between the potential causes and the potential effects, the fuzzy cause and effect engine may then populate the cause bucket with the information captured from the potential causes and populate the effect bucket with the information captured from the potential effects. For example, the information used to populate the cause bucket and the effect bucket may be ordered or organized based on sources that delivered the content to the fuzzy cause and effect engine or time slices associated with the events captured from the potential causes and effects. Alternatively, the information may be ordered or organized based on a combination of the sources that delivered the content, the time slices associated with the events, or any other suitable parameters that appropriately order or organize the information in a manner that can be used to build the relationships between the potential causes and effects. Furthermore, in one implementation, the information used to populate the effect bucket may be labeled to describe certain applications, resources, or other components that the potential effects may be affecting in the system (e.g., the labels may include keywords taken from the authoritative map, a mechanism that was used to submit one or more messages or other data associated therewith, etc.).

According to one aspect of the invention, to determine the fuzzy cause and effect relationships in the workload management system, the system and method described herein may then build a cause and effect relationship bucket that combines the information in the cause bucket with the information in the effect bucket. In particular, the cause and effect relationship bucket may generally combine the information in the cause bucket and the effect bucket in one location and represent the information combined therein using a common format that any suitable component in the workload management system may interact with to consume and utilize the combined information stored therein. Furthermore, combining the information in the cause and effect relationship bucket may enable human personnel to apply manual tunings that provide flexibility over managing correlations that define relationships between causes and effects. In response to suitably building the cause and effect relationship bucket, a pattern search engine may then analyze the information combined therein to derive one or more patterns that represent what may be happening in the system associated with the current problem or interaction (e.g., the pattern search engine may search the cause and effect relationship bucket based on the information used to order or organize the information combined therein and identify any common patterns or common issues among the combined information in the cause and effect relationship bucket). Furthermore, a fuzzy logic correlation engine may apply various fuzzy, logic algorithms to the information combined in the cause and effect relationship bucket to generate the true or false calculations that indicate whether any relationships exist among the causes and effects represented therein. In response to suitably identifying any relationships that exist among the causes and effects represented in the cause and effect relationship bucket, the fuzzy cause and effect engine may create one or more cause and effect diagrams that visually represent the relationships (e.g., Venn diagrams that visually illustrate possible relationships between various causes and effects). Alternatively, any effects having unknown causes and any causes having unknown effects may be stored in an unknown effects buckets, wherein a validation engine may then launch an interface that provides users with an ability to manually identify relationships that may not have been identified with the fuzzy logic correlation engine, apply manual tuning parameters to reconfigure the fuzzy cause and effect engine in order to capture larger data sets, or otherwise apply manual tunings in an effort to identify additional relationships among the events in the unknown effects bucket (e.g., extending time windows to obtain additional causes and effects that may relate to the events in the unknown effects bucket, determining whether certain settings may have caused potentially related causes or effects to not have been captured, etc.).

According to one aspect of the invention, in response to determining the fuzzy cause and effects in the workload management system, the system and method described herein may provide the information in the repeated patterns bucket, the cause and effect diagrams, the unknown effects bucket, or any other suitable output information to a reporting engine. In addition, any additional output information created from the user interacting with the validation engine may be provided to the reporting engine. As such, the reporting engine may suitably process the output information to generate one or more reports that represent the data in a manner that can be suitably consumed by administrators, help desk personnel, or other suitable users that may be interested in viewing the data to understand what may be occurring in the system associated with the current problem or interaction.

Other objects and advantages of the invention will be apparent to those skilled in the art based on the following drawings and detailed description.

BRIEF DESCRIPTION OF THE DRAWINGS

FIG. 1A illustrates a block diagram of an exemplary model-driven architecture in a workload management system, while FIG. 1B illustrates a block diagram of an exemplary service-oriented architecture in the workload management system, according to one aspect of the invention.

DETAILED DESCRIPTION

Figure 1A:
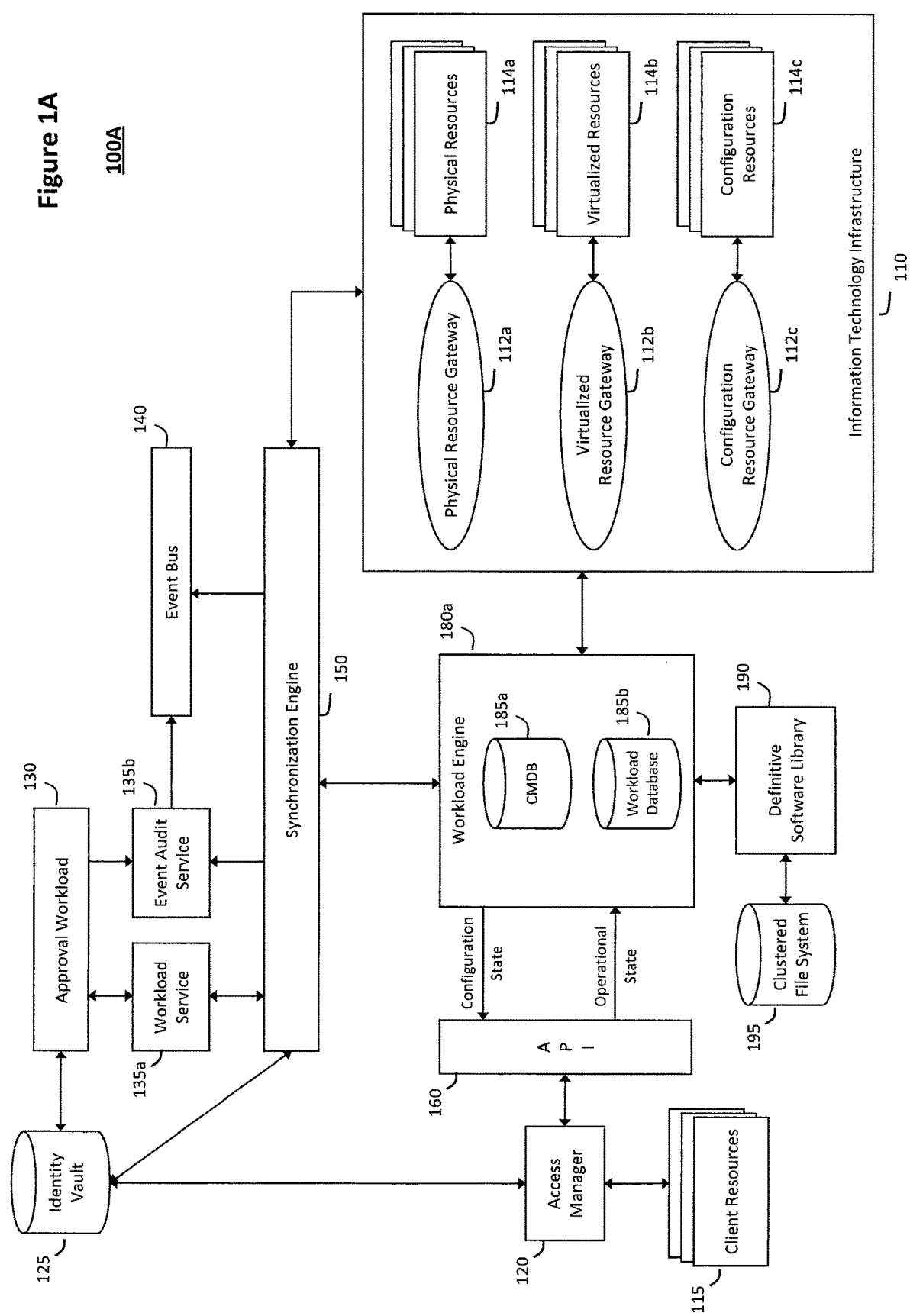

According to one aspect of the invention, FIG. 1A illustrates an exemplary model-driven architecture 100A in an intelligent workload management system, while FIG. 1B illustrates an exemplary service-oriented architecture 100B in the intelligent workload management system. In one implementation, the model-driven architecture 100A shown in FIG. 1A and the service-oriented architecture 100B shown in FIG. 1B may include various components that operate in a substantially similar manner to provide the functionality that will be described in further detail herein. Thus, any description provided herein for components having identical reference numerals in FIGS. 1A and 1B will be understood as corresponding to such components in both FIGS. 1A and 1B, whether or not explicitly described.

In one implementation, the model-driven architecture 100A illustrated in FIG. 1A and the service-oriented architecture 100B illustrated in FIG. 1B may provide an agile, responsive, reliable, and interoperable information technology environment, which may address various problems associated with managing an information technology infrastructure 110 (e.g., growing revenues and cutting costs, managing governance, risk, and compliance, reducing times to innovate and deliver products to markets, enforcing security and access controls, managing heterogeneous technologies and information flows, etc.). To that end, the model-driven architecture 100A and the service-oriented architecture 100B may provide a coordinated design in the intelligent workload management system (or alternatively "the workload management system"), wherein the coordinated design may integrate technologies for managing identities, enforcing policies, assuring compliance, managing computing and storage environments, providing orchestrated virtualization, enabling collaboration, and providing architectural agility, among other things. The model-driven architecture 100A and the service-oriented architecture 100B may therefore provide a flexible framework that may enable the workload management system to allocate various resources 114 in the information technology infrastructure 110 in a manner that balances governance, risk, and compliance with capacities for internal and external resources 114. For example, as will be described in further detail herein, the workload management system may operate within the flexible framework that the model-driven architecture 100A and the service-oriented architecture 100B to deliver information technology tools for managing security, performance, availability, and policy objectives for services provisioned in the information technology infrastructure 110.

Identity Management

In one implementation, as noted above, the technologies integrated by the model-driven architecture 100A and the service-oriented architecture 100B may enable managing identities in the information technology infrastructure 110. In particular, managing identities may present an important concern in the context of managing services in the information technology infrastructure 110 because security, performance, availability, policy objectives, and other variables may have different importance for different users, customers, applications, systems, or other resources 114 that operate in the information technology infrastructure 110. As such, the model-driven architecture 100A and the service-oriented architecture 100B may include various components that enable identity management in the information technology infrastructure 110.

For example, in one implementation, the workload management system may include an access manager 120 (e.g., Novell Access Manager), which may communicate with an identity vault 125 and control access to content, applications, services, and other resources 114 in the information technology infrastructure 110. In one implementation, the access manager 120 may enforce various policy declarations to provide authentication services for any suitable component in the information technology infrastructure 110. For example, the identity vault 125 may include various directories that organize user accounts, roles, policies, and other identity information that the access manager 120 can reference to generate authorization decisions. The access manager 120 and the identity vault 125 may further support federated user identities, wherein a user at any particular client resource 115 may submit single sign-on authentication credentials to the access manager 120, which may then control access to any suitable resource 114 in the information technology infrastructure 110 with the single sign-on authentication credentials (e.g., user names, identifiers, passwords, smart cards, biometrics, etc.). Moreover, the identity information stored in the identity vault 125 may be provided to a synchronization engine 150, whereby the synchronization engine 150 may provide interoperable and transportable identity information throughout the architecture (e.g., via an identity fabric within an event bus 140 that manages transport throughout the architecture).

In one implementation, providing the identity information stored in the identity vault 125 to the synchronization engine 150 may form portable identities that correspond to independent digital representations for various users, applications, systems, or other entities that interact with the information technology infrastructure 110. In particular, the identities maintained in the synchronization engine 150 may generally include abstractions that can provide access to authoritative attributes, active roles, and valid policies for entities that the identity abstractions represent. Thus, synchronizing the identity information stored in the identity vault 125 with the synchronization engine 150 may provide independent and scalable digital identities that can be transported across heterogeneous applications, services, networks, or other systems, whereby the workload management system may handle and validate the digital identities in a cooperative, interoperable, and federated manner.

In one implementation, the identities stored in the identity vault 125 and synchronized with the synchronization engine 150 may be customized to define particular attributes and roles that the identities may expose. For example, a user may choose to create one identity that exposes every attribute and role for the user to applications, services, or other systems that reside within organizational boundaries, another identity that limits the attributes and roles exposed to certain service providers outside the organizational boundaries, and another identity that provides complete anonymity in certain contexts. The identities maintained in the synchronization engine 150 may therefore provide awareness over any authentication criteria that may be required to enable communication and collaboration between entities that interact with the workload management system. For example, the synchronization engine 150 may include a service that can enforce policies controlling whether certain information stored in the identity vault 125 can be shared (e.g., through the access manager 120 or other information technology tools that can manage and customize identities).

In one implementation, the workload management system may further manage identities in a manner that enables infrastructure workloads to function across organizational boundaries, wherein identities for various users, applications, services, and other resources 114 involved in infrastructure workloads may be managed with role aggregation policies and logic that can support federated authentication, authorization, and attribute services. For example, in one implementation, the access manager 120, the identity vault 125, and the synchronization engine 150 may manage identity services externally to applications, services, and other resources 114 that consume the identities, which may enable the workload management system to control access to services for multiple applications using consistent identity interfaces. In particular, the access manager 120, the identity vault 125, and the synchronization engine 150 may define standard interfaces for managing the identity services, which may include authentication services, push authorization services (e.g., tokens, claims, assertions, etc.), pull authorization services (e.g., requests, queries, etc.), push attribute services (e.g., updates), pull attribute services (e.g., queries), and audit services.

As such, in one implementation, the workload management system may employ the identity services provided in the model-driven architecture 100A and the service-oriented architecture 100B to apply policies for representing and controlling roles for multiple identities within any particular session that occurs in the information technology infrastructure 110. For example, in response to a session that includes a user logging into a client machine 115 and invoking a backup service, the workload management system may manage the session with multiple identities that encompass the user, the backup service, and the client machine 115. The workload management system may further determine that the identity for the client machine 115 represents an unsecured machine that resides outside an organizational firewall, which may result in the workload management system retrieving a policy from the identity vault 125 and/or the synchronization engine 150 and applying the policy to the session (e.g., the policy may dynamically prevent the machine 115 and the user from being active in the same session). Thus, the workload management system may manage multiple identities that may be involved in any particular service request to control and secure access to applications, services, and other resources 114 in the information technology infrastructure 110.

In one implementation, the model-driven architecture 100A and the service-oriented architecture 100B may further provide identity services for delegating rights in delegation chains that may involve various different levels of identities. In particular, any particular user may have various roles, attributes, or other identities that define various rights for the user. As such, in one implementation, the rights delegation identity service may enable the user to delegate a time-bounded subset of such rights to a particular service, wherein the service can then make requests to other services on behalf of the user during the delegated time. For example, a user may delegate rights to a backup service that permits the backup service to read a portion of a clustered file system 195 during a particular time interval (e.g., 2 a.m. to 3 a.m.). In response to the file system 195 receiving the read request from the backup service, the identity services may enable the file system 195 to audit identities for the backup service and the user, and further to constrain read permissions within the file system 195 based on the relevant rights defined by the identities for the backup service for the user.

In one implementation, the model-driven architecture 100A and the service-oriented architecture 100B may further provide identity services for defining relative roles, wherein relative roles may be defined where a principal user, application, service, or other entity can only assume a particular role for a particular action when a target of the action has a particular set of identities. For example, a user having a doctor role may only assume a doctor-of-record relative role if an identity for a target of the doctor-of-record action refers to one of the user's patients. In another example, applications may request controlled access to information about an identity for a certain user, wherein the application may retrieve the requested information directly from the access-controlled identity for the user. In particular, the workload management system may determine the information requested by the application and create a workload that indicates to the user the information requested by the application and any action that the application may initiate with the requested information. The user may then make an informed choice about whether to grant the application access to the requested information. Thus, having identities to enable applications may eliminate a need for application-specific data storage or having the application access separate a directory service or another identity information source.

Thus, in the model-driven architecture 100A and the service-oriented architecture 100B, the identity management services may create crafted identities combined from various different types of identity information for various users, applications, services, systems, or other information technology resources 114. In one implementation, while the identity information may generally be stored and maintained in the identity vault 125, the identity information can be composed and transformed through the access manager 120 and/or the synchronization engine 150, with the resulting identity information providing authoritative statements for represented entities that span multiple authentication domains within and/or beyond boundaries for the information technology infrastructure 110. For example, an identity for a user may be encapsulated within a token that masks any underlying credential authentication, identity federation, and attribute attestation. Moreover, in one implementation, the identity services may further support identities that outlive entities that the identities represent and multiple identity subsets within a particular identity domain or across multiple identity domains. As such, the identity services provided in the model-driven architecture 100A and the service-oriented architecture 100B may include various forms of authentication, identifier mapping, token transformation, identity attribute management, and identity relationship mapping.

Policy Enforcement

In one implementation, as noted above, the technologies integrated by the model-driven architecture 100A and the service-oriented architecture 100B may enable enforcing policies in the information technology infrastructure 110. In particular, enforcing policies may present an important concern in the context of managing services in the information technology infrastructure 110 because policies may be driven from multiple hierarchies and depend on operational, legislative, and organizational requirements that can overlap, contradict, and/or override each other. As such, the model-driven architecture 100A and the service-oriented architecture 100B may include various components for defining policies in standardized languages that can be translated, merged, split, or otherwise unified as needed. To that end, the workload management system may have multiple policy decision points and policy definition services for consistently managing and enforcing policies in the information technology infrastructure 110

As such, in one implementation, the model-driven architecture 100A and the service-oriented architecture 100B may provide standard policy languages and service interfaces that enable the workload management system to make consistent decisions based on flexible user needs. In particular, any suitable resource 114 (including workloads and computational infrastructure) may be provided with access to standardized instrumentation that provides knowledge regarding information that may be available, desired, or allowed in the workload management system. In one implementation, the workload management system may invoke various cooperating policy services to determine suitable physical resources 114a (e.g., physical servers, hardware devices, etc.), virtualized resources 114b (e.g., virtual machine images, virtualized servers, etc.), configuration resources 114c (e.g., management agents, translation services, etc.), storage resources (e.g., the clustered file system 195, one or more databases 155, etc.), or other resources 114 for a particular workload. For example, the synchronization engine 150 may dynamically retrieve various policies stored in the databases 155, and an event audit service 135b may then evaluate the policies maintained in the synchronization engine 150 independently from services that subsequently enforce policy decisions (e.g., the event audit service 135b may determine whether the policies permit access to certain information for a particular application and the application may then enforce the policy determination).

In one implementation, separating policy evaluation within the event audit service 135b from policy enforcement within consuming services may enable the workload management system to access the consuming services and manage policy-based control for the service in an independent and simultaneous manner. The event audit service 135b may include a standardized policy definition service that can be used to define policies that span multiple separate application and management domains. For example, in one implementation, the policy definition service may create, manage, translate, and/or process policies separately from other service administration domains and interfaces. As such, the policy definition service may provide interoperability for the separate domains and interfaces, and may further enable compliance services that may be provided in a correlation system 165 and remediation services that may be provided in a workload service 135a.

In one implementation, to ensure correct and effective policy decisions, the policy definition service provided within the event audit service 135b may be configured to obtain data relating to a current state and configuration for resources 114 managed in the infrastructure 110 in addition to data relating to dependencies or other interactions between the managed resources 114. For example, a management infrastructure 170 may include a discovery engine 180b that dynamically monitors various events that the infrastructure 110 generates and pushes onto the event bus 140, which may include an event backplane for transporting the events. Moreover, the discovery engine 180b may query the infrastructure 110 to determine relationships and dependencies among users, applications, services, and other resources 114 in the infrastructure 110. As such, the discovery engine 180b may monitor the event bus 140 to obtain the events generated in the infrastructure 110 and synchronize the events to the synchronization engine 150, and may further synchronize information relating to the relationships and dependencies identified in the infrastructure 110 to the synchronization engine 150. In one implementation, the event audit service 135b may then evaluate any events, resource relationships, resource dependencies, or other information describing the operational state and the configuration state of the infrastructure 110 in view of any relevant policies and subsequently provide any such policy evaluations to requesting entities.

In one implementation, the policy definition service may include standard interfaces for defining policies in terms of requirements, controls, and rules. For example, the requirements may generally be expressed in natural language in order to describe permitted functionality, prohibited functionality, desirable functionality, and undesirable functionality, among other things (e.g., the event audit service 135*b* may capture legislative regulations, business objectives, best practices, or other policy-based requirements expressed in natural language). The controls may generally associate the requirements to particular objects that may be managed in the workload management system, such as individual users, groups of users, physical resources 114*a*, virtualized resources 114*b*, or any other suitable object or resource 114 in the infrastructure 110. In one implementation, the policy definition service may further define types for the controls. For example, the type may include an authorization type that associates an identity with a particular resource 114 and action (e.g., for certain identities, authorizing or denying access to a system or a file, permission to alter or deploy a policy, etc.), or the type may include an obligation type that mandates a particular action for an identity.

Thus, in one implementation, translating requirements into controls may partition the requirements into multiple controls that may define policies for a particular group of objects. Furthermore, rules may apply certain controls to particular resources 114, wherein rules may represent concrete policy definitions. For example, the rules may be translated directly into a machine-readable and machine-executable format that information technology staff may handle and that the event audit service 135*b* may evaluate in order to manage policies. In one implementation, the rules may be captured and expressed in any suitable domain specific language, wherein the domain specific language may provide a consistent addressing scheme and data model to instrument policies across multiple domains. For example, a definitive software library 190 may include one or more standardized policy libraries for translating between potentially disparate policy implementations, which may enable the event audit service 135*b* to provide federated policies interoperable across multiple different domains. As such, the rules that represent the policy definitions may include identifiers for an originating policy implementation, which the policy definition service may then map to the controls that the rules enforce and to the domain specific policy language used in the workload management system (e.g., through the definitive software library 190).

Compliance Assurance

In one implementation, as noted above, the technologies integrated by the model-driven architecture 100A and the service-oriented architecture 100B may enable monitoring for compliance assurances in the information technology infrastructure 110. In particular, compliance assurance may present an important concern in the context of managing services in the information technology infrastructure 110 because policy enforcement encompasses issues beyond location, access rights, or other contextual information within the infrastructure (e.g., due to increasing mobility in computing environments). As such, the model-driven architecture 100A and the service-oriented architecture 100B may define metadata that bounds data to characteristics of data. To that end, the workload management system may employ a standard metadata format to provide interoperability between policies from multiple organizations to enable the policies to cooperate with one another and provide policy-based service control. For example, certain infrastructure workloads may execute under multiple constraints defined by users, the infrastructure 110, sponsoring organizations, or other entities, wherein compliance assurance may provide users with certification that the workloads were properly assigned and executed according to the constraints. In another example, sponsoring organizations and governing bodies may define control policies that constrain workloads, wherein compliance assurance in this context may include ensuring that only authorized workloads have been executed against approved resources 114.

As such, in one implementation, the model-driven architecture 100A and the service-oriented architecture 100B may provide preventative compliance assurance through a compliance management service that supports remediation in addition to monitoring and reporting. For example, when workloads move from data centers internal to the infrastructure 110 into third party processing centers, cloud computing environments, or other environments having reusable computing resource pools where services can be relocated, the workload management system may generate compliance reports 145 that indicate whether any constraints defined for the workloads have been satisfied (e.g., that authorized entities perform the correct work in the correct manner, as defined within the workloads). Thus, compliance may generally be defined to include measuring and reporting on whether certain policies effectively ensure confidentiality and availability for information within workloads, wherein the resulting compliance reports 145 may describe an entire process flow that encompasses policy definition, relationships between configurations and activities that do or do not comply with the defined policies, and identities of users, applications, services, systems, or other resources 114 involved in the process flow.

In one implementation, the workload management system may provide the compliance management service for workloads having specifications defined by users, and further for workloads having specifications defined by organizations. For example, users may generally define various specifications to identify operational constraints and desired outcomes for workloads that the users create, wherein the compliance management service may certify to the users whether or not the operational constraints and desired outcomes have been correctly implemented. With respect to organizational workloads, organizations may define various specifications identifying operational constraints and desired outcomes for ensuring that workloads comply with governmental regulations, corporate best practices, contracts, laws, and internal codes of conduct. Thus, the compliance management service may integrate the identity management services and the policy definition service described above to provide the workload management system with control over configurations, compliance event coverage, and remediation services in the information technology infrastructure 110.

In one implementation, the compliance management service may operate within a workload engine 180*a* provided within the management infrastructure 170 and/or a workload service 135*b* in communication with the synchronization engine 150. The workload engine 180*a* and/or the workload service 135*b* may therefore execute the compliance management service to measure and report on whether workloads comply with relevant policies, and further to remediate any non-compliant workloads. For example, the compliance management service may use the integrated identity management services to measure and report on users, applications, services, systems, or other resources 114 that may be performing operational activity that occurs in the information technology infrastructure 110. In particular, the compliance management service may interact with the access manager 120, the identity vault 125, the synchronization engine 150, or any other suitable source that provides federated identity information to retrieve identities for the entities performing the operational activity, validate the identities, determine relationships between the identities, and otherwise map the identities to the operational activity. For example, in one implementation, the correlation system 165 may provide analytic services to process audit trails for any suitable resource 114 (e.g., correlating the audit trails and then mapping certain activities to identities for resources 114 involved in the activities). Furthermore, in response to the correlation system 165 processing the audit trails and determining that certain policies have been violated, the correlation system 165 may invoke one or more automated remediation workloads to initiate appropriate action for addressing the policy violations.

In one implementation, the compliance management service may further use the integrated policy definition service to monitor and report on the operational activity that occurs in the information technology infrastructure 110 and any policy evaluation determinations that the event audit service 135b generates through the policy definition service. For example, in one implementation, the workload engine 180a and/or the workload service 135b may retrieve information from a configuration management database 185a or other databases 155 that provide federated configuration information for managing the resources 114 in the information technology infrastructure 110. The workload engine 180a and/or the workload service 135b may therefore execute the compliance management service to perform scheduled and multi-step compliance processing, wherein the compliance processing may include correlating operational activities with identities and evaluating policies that may span various different policy domains in order to govern the information technology infrastructure 110. To that end, the model-driven architecture 100A and the service-oriented architecture 100B may provide various compliance management models may be used in the compliance management service.

In one implementation, the compliance management models may include a wrapped compliance management model that manages resources 114 lacking internal awareness over policy-based controls. The compliance management service may augment the resources 114 managed in the wrapped compliance model with one or more policy decision points and/or policy enforcement points that reside externally to the managed resources 114 (e.g., the event audit service 135b). For example, the policy decision points and/or the policy enforcement points may intercept any requests directed to the resources 114 managed in the wrapped compliance model, generate policy decisions that indicate whether the resources 114 can properly perform the requests, and then enforce the policy decisions (e.g., forwarding the requests to the resources 114 in response to determining that the resources 114 can properly perform the requests, denying the requests in response to determining that the resources 114 can properly perform the requests, etc.). Thus, because the resources 114 managed in the wrapped compliance model generally perform any requests that the resources 114 receive without considering policy-based controls or compliance issues, the event audit service 135b may further execute the compliance management service to wrap, coordinate, and synthesize an audit trail that includes data obtained from the managed resources 114 and the wrapping policy definition service.

In one implementation, the compliance management models may include a delegated compliance management model to manage resources 114 that implement a policy enforcement point and reference an external policy decision point, wherein the resources 114 managed in the delegated compliance management model may have limited internal awareness over policy-based controls. As such, in one implementation, the compliance management service may interleave policy decisions or other control operations generated by the external policy decision point with the internally implemented policy enforcement point to provide compliance assurance for the resources 114 managed in the delegated compliance management model. The delegated compliance management model may therefore represent a hybrid compliance model, which may apply to any suitable service that simultaneously anticipates compliance instrumentation but lacks internal policy control abstractions (e.g., the internally implemented policy enforcement point may anticipate the compliance instrumentation, while the externally referenced policy decision point has the relevant policy control abstractions). Thus, in the delegated compliance management model, the compliance management service may have fewer objects to coordinate than in the wrapped compliance management model, but the event audit service 135b may nonetheless execute the compliance management service to coordinate and synthesize an audit trail that includes data obtained from the managed resources 114 and the delegated external policy decision point.

In one implementation, the compliance management models may include an embedded compliance management model that manages resources 114 that internally implement policy enforcement points and policy decision points, wherein the resources 114 managed in the embedded compliance management model may have full internal awareness over policy-based controls. As such, in one implementation, the resources 114 managed in the embedded compliance management model may employ the internally implemented policy enforcement points and policy decision points to instrument any service and control operations for requests directed to the resources 114. In one implementation, to provide flexible compliance assurance, resources 114 managed in the embedded compliance management model may expose configuration or customization options via an externalized policy administration point. Thus, the embedded compliance management model may provide an integrated and effective audit trail for compliance assurance, which may often leave the compliance management service free to perform other compliance assurance processes.

Accordingly, in one implementation, the compliance management service may obtain information for any resource 114 managed in the information technology infrastructure 110 from the configuration management database 185a or other databases 155 that include a federated namespace for the managed resources 114, configurations for the managed resources 114, and relationships among the managed resources 114. In addition, the compliance management service may reference the configuration management database 185a or other the databases 155 to arbitrate configuration management in the infrastructure 110 and record previous configurations histories for the resources 114 in the configuration management database 185a or other databases 155. As such, the compliance management service may generally maintain information relating to identities, configurations, and relationships for the managed resources 114, which may provide a comparison context for analyzing subsequent requests to change the infrastructure 110 and identifying information technology services that the requested changes may impact.

Computing and Storage Environments

In one implementation, as noted above, the technologies integrated by the model-driven architecture 100A and the service-oriented architecture 100B may include managing computing and storage environments that support services in the infrastructure 110. In particular, in one implementation, the computing and storage environments used to support services in the infrastructure 110 may employ Linux operating environments, which may generally include an operating system distribution with a Linux kernel and various open source packages (e.g., gcc, glibc, etc.) that collectively provide the Linux operating environments. In one implementation, the Linux operating environments may generally provide a partitioned distribution model for managing the computing and storage environments employed in the workload management system. Further, in one implementation, a particular Linux distribution may be bundled for operating environments pre-installed in the workload management system (e.g., openSUSE, SUSE Linux Enterprise, etc.), which may enable vendors of physical hardware resources 114a to support every operating system that the vendors' customers employ without overhead that may introduced with multiple pre-installed operating environment choices.

In one implementation, the partitioned distribution model may partition the Linux operating environments into a physical hardware distribution (often referred to as a "pDistro"), which may include physical resources 114a that run over hardware to provide a physical hosting environment for virtual machines 114b. For example, in one implementation, the physical hardware distribution may include the Linux kernel and various hypervisor technologies that can run the virtual machines 114b over the underlying physical hosting environment, wherein the physical hardware distribution may be certified for existing and future-developed hardware environments to enable the workload management system to support future advances in the Linux kernel and/or hypervisor technologies. Alternatively (or additionally), the workload management system may release the physical hardware distribution in a full Linux distribution version to provide users with the ability to take advantage of future advances in technologies at a faster release cycle.

In one implementation, the partitioned distribution model may further partition the Linux operating environments into a virtual software distribution (often referred to as a "vDistro"), which may include virtual machines 114b deployed for specific applications or services that run, enable, and otherwise support workloads. More particularly, any particular virtual software distribution may generally include one or more Linux package or pattern deployments, whereby the virtual machines 114b may include virtual machines images with "just enough operating system" (JeOS) to support the package or pattern deployments needed to run the applications or services for the workloads. In one implementation, the virtual software distribution may include a particular Linux product (e.g., SUSE Linux Enterprise Server) bundled with hardware agnostic virtual drivers, which may provide configuration resources 114c for tuning virtualized resources 114b for optimized performance.

In one implementation, the particular virtual software distribution may be certified for governmental security requirements and for certain application vendors, which may enable the workload management system to update any physical resources 114a in the physical hardware distribution underlying the virtual software distribution without compromising support contracts with such vendors. In particular, in response to future changes in technology that may improve support for Linux operating environments, resulting improvements may occur in techniques for building and deploying Linux operating environments. Thus, where many application vendors currently tend to only provide support for certain Linux applications that run in certain Linux versions, the workload management system may enable support for any particular Linux application or version, which may drive Linux integration and adoption across the information technology infrastructure 110. In one implementation, for example, the workload management system may employ Linux applications and distributions created using a build system that enables any suitable application to be built and tested on different versions of Linux distributions (e.g., an openSUSE Build Service, SUSE Studio, etc.). For example, in response to receiving a request that includes unique specifications for a particular Linux application, the workload management system may notify distribution developers to include such specifications in the application, with the specifications then being made available to other application developers.

Thus, in one implementation, the Linux build system employed in the workload management system may enable distribution engineers and developers to detect whether changes to subsequent application releases conflict with or otherwise break existing applications. In particular, changes in systems, compiler versions, dependent libraries, or other resources 114 may cause errors in the subsequent application releases, wherein commonly employing the Linux build system throughout the workload management system may provide standardized application support. For example, in one implementation, the workload management system may employ certified implementations of the Linux Standard Base (LSB), which may enable independent software vendors (ISVs) to verify compliance, and may further provide various support services that can provide policy-based automated remediation for the Linux operating environments through the LSB Open Cluster Framework (OCF).

In one implementation, the Linux operating environments in the workload management system may provide engines that support orchestrated virtualization, collaboration, and architectural agility, as will be described in greater detail below. Further, to manage identities, enforce policies, and assure compliance, the Linux operating environments may include a "syslog" infrastructure that coordinate and manages various internal auditing requirements, while the workload management system may further provide an audit agent to augment the internal auditing capabilities that the "syslog" infrastructure provides (e.g., the audit agent may operate within the event audit service 135b to uniformly manage the Linux kernel, the identity services, the policy services, and the compliance services across the workload management system). For example, in one implementation, partitioning the monolithic Linux distribution within a multiple layer model that includes physical hardware distributions and virtual software distributions may enable each layer of the operating system to be developed, delivered, and supported at different schedules. In one implementation, a scheduling system 180c may coordinate such development, delivery, and support in a manner that permits dynamic changes to the physical resources 114a in the infrastructure 110, which provide stability and predictability for the infrastructure 110.

In one implementation, partitioning the Linux operating environments into physical hardware distributions and virtual software distributions may further enable the workload management system to run workloads in computing and storage environments that may not necessarily be co-located or directly connected to physical storage systems that contain persistent data. For example, the workload management system may support various interoperable and standardized protocols that provide communication channels between users, applications, services, and a scalable replicated storage system, such as the clustered file system 195 illustrated in FIG. 1A, wherein such protocols may provide authorized access between various components at any suitable layer within the storage system.

In one implementation, the clustered file system 195 may generally include various block storage devices, each of which may host various different file systems. In one implementation, the workload management system may provide various storage replication and version management services for the clustered file system 195, wherein the various block storage devices in the clustered file system 195 may be organized in a hierarchical stack, which may enable the workload management system to separate the clustered file system 195 from operating systems and collaborative workloads. As such, the storage replication and version management services may enable applications and storage services to run in cloud computing environments located remotely from client resources 115.

In one implementation, various access protocols may provide communication channels that enable secure physical and logical distributions between subsystem layers in the clustered file system 195 (e.g., a Coherent Remote File System protocol, a Dynamic Storage Technology protocol, which may provide a file system-to-file system protocol that can place a particular file in one of various different file systems based on various policies, or other suitable protocols). Furthermore, traditional protocols for access files from a client resource 115 (e.g., HTTP, NCP, AFP, NFS, etc.) may be written to file system specific interfaces defined in the definitive software library 190. As such, the definitive software library 190 may provide mappings between authorization and semantic models associated with the access protocols and similar elements of the clustered file system 195, wherein the mappings may be dynamically modified to handle any new protocols that support cross-device replication, device snapshots, block-level duplication, data transfer, and/or services for managing identities, policies, and compliance.

As such, the storage replication and version management services may enable users to create workloads that define identity and policy-based storage requirements, wherein team members identities may be used to dynamically modify the team members and any access rights defined for the team members (e.g., new team members may be added to a "write access" group, users that leave the team may be moved to a "read access" group or removed from the group, policies that enforce higher compliance levels for Sarbanes-Oxley may be added in response to an executive user joining the team, etc.). For example, a user that heads a distributed cross-department team developing a new product may define various members for the team and request permission for self-defined access levels for the team members (e.g., to enable the team members to individually specify a storage amount, redundancy level, and bandwidth to allocate). The workload management system may then provide fine grained access control for a dynamic local storage cache, which may move data stored in the in the clustered file system 195 to a local storage for a client resource 115 that accesses the data (i.e., causing the data to appear local despite being persistently managed in the clustered file system 195 remotely from the client resource 115). As such, individual users may then use information technology tools define for local area networks to access and update the data, wherein the replication and version management services may further enable the individual users to capture consistent snapshots that include a state of the data across various e-mail systems, databases 155, file systems 195, cloud storage environments, or other storage devices.

In one implementation, the storage replication and version management services may further enable active data migration and auditing for migrated data. For example, policies or compliance issues may require data to be maintained for a longer lifecycle than hardware and storage systems, wherein the workload management system may actively migrate certain data to long-term hardware or an immutable vault in the clustered file system 195 to address such policies or compliance issues. Furthermore, identity-based management for the data stored in the clustered file system 195 may enable the workload management system to control, track, and otherwise audit ownership and access to the data, and the workload management system may further classify and tag the data stored in the clustered file system 195 to manage the data stored therein (e.g., the data may be classified and tagged to segregate short-term data from long-term data, maintain frequently used data on faster storage systems, provide a content-addressed mechanism for efficiently searching potentially large amounts of data, etc.). Thus, the workload management system may use the storage replication and version management services to generate detailed reports 145 for the data managed in the clustered file system.

In one implementation, the storage replication and version management services may further provide replication services at a file level, which may enable the workload management system to control a location, an identity, and a replication technique (e.g., block-level versus byte-level) for each file in the clustered file system 195. In addition, the storage replication and version management services may further enable the workload management system to manage storage costs and energy consumption (e.g., by controlling a number of copies created for any particular file, a storage medium used to store such copies, a storage location used to store such copies, etc.). Thus, integrating federated identities managed in the identity vault 125 with federated policy definition services may enable the workload management system to manage the clustered file system 195 without synchronizing or otherwise copying every identity with separate identity stores associated with different storage subsystems.

Orchestrated Virtualization

In one implementation, as noted above, the technologies integrated by the model-driven architecture 100A and the service-oriented architecture 100B may provide orchestrated virtualization for managing services provided in the information technology infrastructure 110. In particular, virtualization generally ensures that a machine runs at optimal utilization by allowing services to run anywhere, regardless of requirements or limitations that underlying platforms or operating systems may have. Thus, the workload management system may define standardized partitions that control whether certain portions of the operating system execute over hardware provided in a hosting environment, or inside virtual machines 114b that decouple applications and services from the hardware on which the virtual machines 114b have been deployed. The workload management system may further employ a standardized image for the virtual machines 114b, provide metadata wrappers for encapsulating the virtual machines 114b, and provide various tools for managing the virtual machines 114b (e.g., "zero residue" management agents that can patch and update running instances of virtual machines 114b stored in the clustered file system 195, databases 155, or other repositories).

In one implementation, the virtualized services provided in the workload management system may simplify processes for developing and deploying applications, which may enable optimal utilization of physical resources 114a in the infrastructure. Furthermore, virtualization may be used to certify the Linux operating environments employed in the infrastructure 110 for any suitable platform that include various physical resources 114a. In particular, as described in further detail above, the workload management system may partition the Linux operating environments into a multiple-layer distribution that includes a physical distribution and a virtual distribution, wherein the physical distribution may represent a lower-level interface to physical resources 114a that host virtual machines 114b, while the virtual distribution may represent any applications or services hosted on the virtual machines 114b.

For example, in one implementation, the physical distribution may include a minimally functional kernel that bundles various base drivers and/or independent hardware vendor drivers matched to the physical resources 114a that host the virtual machines 114b. In one implementation, the physical distribution may further include a pluggable hypervisor that enables multiple operating systems to run concurrently over the hosting physical resources 114a, a minimal number of software packages that provide core functionality for the physical distribution, and one or more of the zero residue management agents that can manage any virtualized resources 114b that may be hosted on the physical resources 114a. As such, in response to any particular request to install a physical distribution, package selections available to the workload management system may include packages for the kernel, the hypervisor, the appropriate drivers, and the management agents that may be needed to support brands or classes of the underlying physical resources 114a.

Furthermore, in one implementation, the virtual distribution may include a tuned appliance, which may generally encapsulate an operating system and other data that supports a particular application. In addition, the virtual distribution may further include a workload profile encapsulating various profiles for certifying the appliance with attestation tokens (e.g., profiles for resources 114, applications, service level agreements, inventories, cost, compliance, etc.). Thus, the virtual distribution may be neutral with respect to the physical resources 114a included in the physical distribution, wherein the virtual distribution may be managed independently from any physical drivers and applications hosted by a kernel for the virtual distribution (e.g., upgrades for the kernels and physical device drivers used in the physical distributions may be managed independently from security patches or other management for the kernels and applications used in the virtual distributions). Thus, partitioning the physical distributions from the virtual distributions may remove requirements for particular physical resources 114a and preserve records for data that may require a specific application running on a specific operating system.

In one implementation, from a business perspective, the workload management system may secure the virtualized resources 114b in a similar manner as applications deployed on the physical resources 114a. For example, the workload management system may employ any access controls, packet filtering, or other techniques used to secure the physical resources 114a to enforce containment and otherwise secure the virtualized resources 114b, wherein the virtualized resources 114b may preserve benefits provided by running a single application on a single physical server 114a while further enabling consolidation and fluid allocation of the physical resources 114a. Furthermore, the workload management system may include various information technology tools that can be used to determine whether new physical resources 114a may be needed to support new services, deploy new virtual machines 114b, and establish new virtual teams that include various collaborating entities.

In one implementation, the information technology tools may include a trending tool that indicate maximum and minimum utilizations for the physical resources 114a, which may indicate when new physical resources 114a may be needed. For example, changes to virtual teams, different types of content, changes in visibility, or other trends for the virtualized resources 114b may cause changes in the infrastructure 110, such as compliance, storage, and fault tolerance obligations, wherein the workload management system may detect such changes and automatically react to intelligently manage that the resources 114 in the infrastructure 110. In one implementation, the information technology tools may further include a compliance tool providing a compliance envelope for applications running or services provided within any suitable virtual machine 114b. More particularly, the compliance envelope may save a current state of the virtual machine 114b at any suitable time and then push an updated version of the current state to the infrastructure 110, whereby the workload management system may determine whether the current state of the virtual machine 114b complies with any policies that may have been defined for the virtual machine 114b. For example, the workload management system may support deploying virtual machines 114b in demilitarized zones, cloud computing environments, or other data centers that may be remote from the infrastructure 110, wherein the compliance envelope may provide a security wrapping to safely move such virtual machines 114b and ensure that only entities with approved identities can access the virtual machines 114b.

Thus, from an architectural perspective, the virtualized resources 114b may enable the workload management system to manage development and deployment for services and applications provisioned in the infrastructure 110. For example, rather than dynamically provisioning physical resources 114a to deal with transient peaks in load and availability on a per-service basis, which may result in under-utilized physical resources 114a, the workload management system may host multiple virtual machines 114b on one physical machine 114a to optimize utilization levels for the physical resources 114a, which may dynamically provisioned physical resources 114a that enable mobility for services hosted in the virtual machines 114b. Thus, in one implementation, mobile services may enable the workload management system to implement live migration for services that planned maintenance events may impact without adversely affecting an availability of such services, while the workload management system may implement clustering or other availability strategies to address unplanned events, such as; hardware or software failures.

In one implementation, the workload management system may further provide various containers to manage the virtual machines 114b, wherein the containers may include a security container, an application container, a service level agreement container, or other suitable containers. The security container may generally provide hardware-enforced isolation and protection boundaries for various virtual machines 114b hosted on a physical resource 114a and the hypervisor hosting the virtual machines 114b. In one implementation, the hardware-enforced isolation and protection boundaries may be coupled with a closed management domain to provide a secure model for deploying the virtual machines 114b (e.g., one or more security labels can be assigned to any particular virtual machine 114b to contain viruses or other vulnerabilities within the particular virtual machine 114b). Furthermore, in the context of tuned appliances, wherein one virtual machine 114*b* hosts one service that supports one particular application, the application container may package the service within a particular virtual machine image 114*b*. As such, the virtual machine image 114*b* may include a kernel and a runtime environment optimally configured and tuned for the hosted service. Similarly, the service level agreement container may dynamically monitor, meter, and allocate resources 114 to provide quality of service guarantees on a per-virtual machine 114*b* basis in a manner transparent to the virtual machine kernel 114*b*.

In one implementation, the various containers used to manage the virtual machines 114*b* may further provide predictable and custom runtime environments for virtual machines 114*b*. In particular, the workload management system may embed prioritization schemes within portions of an operating system stack associated with a virtual machine 114*b* that may adversely impact throughput in the operating system. For example, unbounded priority inversion may arise in response to a low-priority task holding a kernel lock and thereby blocking a high-priority task, resulting in an unbounded latency for the high-priority task. As such, in one implementation, the prioritization schemes may embed a deadline processor scheduler in the hypervisor of the virtual machine 114*b* and build admission control mechanisms into the operating system stack, which may enable the workload management system to distribute loads across different virtual machine 114*b* and support predictable computing. In addition, the workload management system may decompose kernels and operating systems for virtual machines 114*b* to provide custom runtime environments. For example, in the context of a typical virtual machine 114*b*, an "unprivileged guest" virtual machine 114*b* may hand off processing to a "helper" virtual machine 114*b* at a device driver level. Thus, to support server-class applications that may depend on having a portable runtime environment, the workload management system may use the decomposed kernels and operating systems to dynamically implement an operating system for a particular virtual machine 114*b* at runtime (e.g., the dynamically implemented operating system may represent a portable runtime that can provide a kernel for a virtual machine 114*b* that hosts a service running a server-class application, which may be customized as a runtime environment specific to that service and application).

In one implementation, the workload management system may further employ different virtualization technologies in different operating environments. For example, in one implementation, the workload management system may implement Type 1 hypervisors for virtualized server resources 114*b* and Type 2 hypervisors for virtualized workstation, desktop, or other client resources 115. In particular, Type 1 hypervisors generally control and virtualize underlying physical resources 114*a* to enable hosting guest operating systems over the physical resources 114*a* (e.g., providing coarse-level scheduling to partition the physical resources 114*a* in a manner that can meet quality of service requirements for each of the guest operating systems hosted on the physical resources 114*a*). Thus, the workload management system may implement Type 1 hypervisors for virtualized server resources 114*b* to leverage performance and fault isolation features that such hypervisors provide. In contrast, Type 2 hypervisors generally include use a host operating system as the hypervisor, which use Linux schedulers to allocate resources 114 to guest operating systems hosted on the hypervisor. In Type 2 hypervisor architectures, such as the VMware GSX Server, Microsoft Virtual PC, and Linux KVM, hosted virtual machines 114*b* appear as a process similar to any other hosted process. Thus, because workstations, desktops, and other client resources 115 may include hardware that may or may not support virtualization, the workload management system may provide centralized desktop management and provisioning using Type 2 hypervisors. For example, the workload management system may manage and maintain desktop environments as virtual appliances 114*b* hosted in the infrastructure 110 and then remotely deliver the desktop environments to remote client resources 115 (e.g., in response to authenticating an end user at a particular client resource 115, the virtual appliance 114*b* carrying the appropriate desktop environment may be delivered for hosting to the client resource 115, and the client resource 115 may transfer persistent states for the desktop environment to the infrastructure 110 to ensure that the client resource 115 remains stateless).

In one implementation, orchestrated virtualization may generally refer to implementing automated policy-based controls for virtualized services. For example, an orchestrated data center may ensure compliance with quality of service agreements for particular groups of users, applications, or activities that occur in the information technology infrastructure 110. The workload management system may therefore provide a policy-based orchestration service to manage virtualized resources 114*b*, wherein the orchestration service may gather correct workload metrics without compromising performance in cloud computing environments or other emerging service delivery models. For example, workloads that users define may be executed using coordinated sets of virtual machines 114*b* embedding different application-specific operating systems, wherein the workload management system may provision and de-provision the virtual machines 114*b* to meet requirements defined in the workload (e.g., using standard image formats and metadata wrappers to encapsulate the workloads, embed standard hypervisors in the virtual machines 114*b*, physical-to-virtual (P2V) or virtual-to-virtual (V2V) conversion tools to translate between different image formats, etc.). Furthermore, in cloud computing environments that can include unpredictable sets of dynamic resources external to the infrastructure 110, the workload management system coordinate such resources using a closed-loop management infrastructure 170 that manages declarative policies, fine-grained access controls, and orchestrated management and monitoring tools.

In one implementation, the workload management system may further manage the orchestrated data center to manage any suitable resources 114 involved in the virtualized workloads, which may span multiple operating systems, applications, and services deployed on various physical resources 114*a* and/or virtualized resources 114*b* (e.g., a physical server 114*a* and/or a virtualized server 114*b*). Thus, the workload management system may balance resources 114 in the information technology infrastructure 110, which may align management of resources 114 in the orchestrated data center with business needs or other constraints defined in the virtualized workloads (e.g., deploying or tuning the resources 114 to reduce costs, eliminate risks, etc.). For example, as described in further detail above, the configuration management database 185*a* may generally describe every resource 114 in the infrastructure 110, relationships among the resources 114, and changes, incidents, problems, known errors, and/or known solutions for managing the resources 114 in the infrastructure 110.

As such, the policy-based orchestration service may provide federated information indexing every asset or other resource 114 in the infrastructure 110, wherein the workload management system may reference the federated information to automatically implement policy-controlled best practices (e.g., as defined in the Information Technology Infrastructure Library) to manage changes to the infrastructure 110 and the orchestrated data center. For example, the configuration management database 185a may model dependencies, capacities, bandwidth constraints, interconnections, and other information for the resources 114 in the infrastructure 110, which may enable the workload management system to perform impact analysis, "what if" analysis, and other management functions in a policy-controlled manner. Furthermore, as noted above, the configuration management database 185a may include a federated model of the infrastructure 110, wherein the information stored therein may originate from various different sources. Thus, through the federated model, the configuration management database 185a may appear as one "virtual" database incorporating information from various sources without introducing overhead otherwise associated with creating one centralized database that potentially includes large amounts of duplicative data.

In one implementation, the orchestration service may automate workloads across various physical resources 114a and/or virtualized resources 114b using policies that match the workloads to suitable resources 114. For example, deploying an orchestrated virtual machine 114b for a requested workload may include identifying a suitable host virtual machine 114b that satisfies any constraints defined for the workload (e.g., matching tasks to perform in the workload to resources 114 that can perform such tasks). In response to identifying allocating and deploying the suitable host virtual machine 114b, deploying the orchestrated virtual machine 114b for the workload may include the workload management system positioning an operating system image on the host virtual machine 114b, defining and running the orchestrated virtual machine 114b on the chosen host virtual machine 114b, and then monitoring, restarting, or moving the virtual machine 114b as needed to continually satisfy the workload constraints.

In one implementation, the orchestration service may include various orchestration sub-services that collectively enable management over orchestrated workloads. For example, the orchestration service may be driven by a blueprint sub-service that defines related resources 114 provisioned for an orchestrated workload, which the workload management system may manage as a whole service including various different types of resources 114. Furthermore, a change management sub-service may enable audited negotiation for service change requests, including the manner and timing for committing the change requests (e.g., within an approval workload 130). The sub-services may further include an availability management sub-service that can control and restart services in a policy-controlled manner, a performance management sub-service that enforces runtime service level agreements and policies, a patch management sub-service that automatically patches and updates resources 114 in response to static or dynamic constraints, and a capacity management sub-service that can increase or reduce capacities for resources 114 in response to current workloads.

To provide exemplary contexts for some of the orchestration sub-services noted above, the availability management sub-service may automatically migrate a virtual machine 114b to another physical host 114a in response to a service restart failing on a current physical host 114a more than a policy-defined threshold number of times. With respect to the performance management sub-service, in response to determining that a service running at eighty percent utilization can be cloned, the service may be cloned to create a new instance of the service and the new instance of the service may be started automatically. Furthermore, to manage a patch for running instances of a service, the patch management sub-service may test the patch against a test instance of the service and subsequently apply the patch to the running service instance in response to the test passing. Regarding the capacity management sub-service, an exemplary service instance may include a service level agreement requiring a certain amount of available storage for the service instance, wherein the capacity management sub-service may allocate additional storage capacity to the service instance in response to determining that the storage capacity currently available to the service instance has fallen below a policy-defined threshold (e.g., twenty percent).

In one implementation, the orchestration service may incorporate workflow concepts to manage approval workloads 130 or other management workloads, wherein a workload database 185b may store information that the workload management system can use to manage the workloads. For example, in one implementation, an approval workload 130 may include a request to provision a particular service to a particular user in accordance with particular constraints, wherein the approval workload 130 may include a sequence of activities that includes a suitable management entity reviewing the constraints defined for the service, determining whether any applicable policies permit or prohibit provisioning the service for the user, and deploying the service in response to determining that the service can be provisioned, among other things. Thus, the workload engine 180a may execute the orchestration service to map the sequence of activities defined for any particular workload to passive management operations and active dynamic orchestration operations. For example, the workload database 185b may stores various declarative service blueprints that provide master plans and patterns for automatically generating service instances, physical distribution images and virtual distribution images that can be shared across the workload management system to automatically generate the service instances, and declarative response files that define packages and configuration settings to automatically apply to the service instances.

Collaboration

In one implementation, as noted above, the technologies integrated by the model-driven architecture 100A and the service-oriented architecture 100B may enable collaboration between entities that interact with the services provided in the information technology infrastructure 110. In particular, collaboration may generally involve dynamic teams that cross traditional security and policy boundaries. For example, where loosely affiliated organizations share data and applications, the workload management system may enable continued collaboration even when some of the participants sharing the data and applications may be temporarily offline (e.g., the workload management system may authorize certain users to allocate portions of local client resources 115 to support cross-organizational endeavors). Thus, the workload management system may provide a standard interface 160 designed to enable dynamic collaboration for end users that simplify interaction with complex systems, which may provide organizations with opportunities for more productive and agile workloads.

In one implementation, the workload management system may provide a collaboration service that enables workloads to span multiple users, applications, services, systems, or other resources 114. For example, multiple users may collaborate and share data and other resources 114 throughout the workload management system, both individually and within virtual teams (e.g., via a service bus that transports data relating to services or other resources 114 over the event bus 140). As such, the workload management system may support virtual team creation that can span organizational and geographic boundaries, wherein affiliations, content, status, and effectiveness may be represented for identities that have membership in any particular virtual team (e.g., to enable online and offline interaction between team members). In one implementation, the workload management system may provide enriched collaboration content (e.g., images, video, text, data feeds), and may efficiently transport the collaboration content between team members (e.g., via the service bus). Furthermore, the workload management system may integrate desktops, laptops, personal digital assistants, smart phones, or other suitable client resources 115 into virtual team collaboration experiences in order to meet emerging demands for mobile, interoperable, and integrated access. Thus, the collaboration enabled in the workload management system may operate in an adaptive collaborative environment, which may unify technologies for online integrated media sharing with offline authoring and editing.

In one implementation, the collaboration service may generally include a web-based platform that support inter-organization and intra-organization management for virtual teams, interoperability between various different collaboration products, social networking to deliver information that enables the virtual teams to interact efficiently either online or offline, and federated searches against any suitable information source, among other things. For example, in one implementation, the collaboration service may include various collaboration sub-services that collectively enable the adaptive collaborative environment, including a client sub-service, an aggregation sub-service, an information sub-service, a real-time collaboration sub-service, and a metadata sub-service.

In one implementation, the client sub-service may provide communication interfaces with real-time online systems, offline systems, and user interfaces. In particular, functionality for the client sub-service may be provided in a web-based interface that supports interaction with the real-time online systems in addition to software that can execute locally at client resources 115 to provide offline access to shared data and real-time meetings that may involve shared applications and shared desktops. For example, in one implementation, the client sub-service may communicate with the aggregation sub-service to coordinate the communication and collaboration across various information sources, wherein the aggregation sub-service may route messages to the appropriate information sources in appropriate formats. Furthermore, to ensure that collaborative contexts reference information that may be distributed across the infrastructure 110 rather than hosted within one particular application, the information sub-service may integrate the different information sources within the collaborative environment. As such, the virtual teams may connect and collaborate using information that originates anywhere across the infrastructure 110, and the information sub-service may enable members of the virtual teams to discuss information or other content from the various sources in an interactive manner. The real-time collaboration sub-service may interact with the information sub-service to provide real-time meetings that include audio content, video content, instant message content, and other forms of communication content in real-time collaborative contexts within the infrastructure 110 and with third-parties.

In one implementation, the metadata sub-service may provide a "helper" service to the aggregation and information sub-services, collecting ancillary metadata generated during interaction between virtual team members and create collaborative threads to maintain contexts that generated the data. Furthermore, the metadata sub-service may evaluate the ancillary metadata to discover new and relevant links between information sources and integrate data that can potentially originate from various disparate information sources. For example, the metadata sub-service may provide a uniform format for classifying data collected during collaborative contexts, which may provide a single source for virtual team members to search and display the data across any suitable collaboration source. Similarly, the metadata sub-service may index and unify data collected from disparate network sources, including various search engines and content aggregation services, to help the virtual team members to locate information that may be interesting or otherwise relevant to the collaborative contexts. As such, the various sub-services integrated within the collaboration service may provide a collaborative environment that supports dynamic interaction across organizational boundaries and different information sources in a manner that can account for any particular virtual team member's personal preferences.

Architectural Agility

In one implementation, as noted above, the technologies integrated by the model-driven architecture 100A and the service-oriented architecture 100B may collectively provide various services that the workload management system can use to manage workloads and enable intelligent choices in an information technology infrastructure 110. Furthermore, various horizontal integration components may be distributed in the workload management system to integrate the various technologies employed in the model-driven architecture 100A and the service-oriented architecture 100B and provide an agile and interoperable information technology infrastructure 110.

In particular, the horizontal integration components distributed across the workload management system may provide agility and interoperability to the information technology infrastructure 110 through support for various emerging service delivery models, including Web 2.0, Software as a Service (SaaS), mashups, hardware, software, and virtual appliances, cloud computing, grid computing, and thin clients, among others. For example, in one implementation, every service, application, or other resource 114 in the workload management system may be provided with an application programming interface 160 that can provide connectivity between different operating systems, programming languages, graphical user interface toolkits, or other suitable services, applications, or resources 114.

In one implementation, the application programming interface 160 may include a Representational State Transfer (REST) application program interface 160, which may use standard methods defined in the Hypertext Transfer Protocol (HTTP), wherein using standardized types to format data may ensure interoperability. In one implementation, the REST interface 160 may define a Uniform Resource Identifier (URI) that represents a unique identity for any suitable entity, and may further define relationships between the represented identities with hyperlinks that can be selected to access information for related identities, attribute claims, roles, policies, workloads, collaboration spaces, and workflow processes. Thus, through the use of URIs, hyperlinks, and other standard HTTP methods, the REST interface 160 may provide an interface to a data ecosystem that can be navigated in a web-based environment that can be used anywhere in the workload management system. In one implementation, the REST interface 160 may declare a namespace having version controls and standard methods to read and write to the data ecosystem, and may include a URI registry containing the URIs that represent the identities in the data ecosystem. Thus, any suitable resource 114 may programmatically discover other identities that communicate using the REST interface 160 (e.g., the REST interface 160 may be implemented in a communication gateway 112a to physical resources 114a, a communication gateway 112b to virtualized resources 114a, a communication gateway 112c to configuration resources 114c, etc.).

Furthermore, in one implementation, the workload management system may extend an application program interface stack for the supplied REST interface 160, which may enable new services, applications, and other resources 114 to be integrated into the workload management system in a manner that automatically inherits the identity-based and policy-controlled services implemented in the workload management system. In particular, the supplied application program interface stack may generally include a unified adapter and a proxy to existing and future technologies using protocols to enable services that communicate through the REST interface 160 regardless of whether the services reside in the infrastructure 110, a cloud computing environment, a third party data center, or elsewhere (e.g., web service protocols, lightweight directory protocols, messaging queue protocols, remote procedure call protocols, etc.). To provide support to developers and users that extend the application program interface stack supplied for the REST interface 160, a Recipe-based Development Kit (RDK) may provide full source code examples for various operating systems, programming languages, and graphical user interface toolkits.

Additionally, in one implementation, the workload engine 180a may manage creation of application program interface keys for the REST interface 160 stack, whereby auditing and policy-based approvals may be supported for provisioning the application program interface keys. For example, the workload management system may deploy widgets to client desktops 115, wherein the widget may track identities and contexts that include attempts to access the REST interface 160 stack. Thus, in response to provisioning or auditing application program interface keys, platform authentication and policy checks may be triggered against the accessing identity and the context that the keys supply. In a similar manner, the application program interface keys may enable the workload management system to meter costs for the information technology infrastructure 110.

Thus, the standardized stack supplied for the REST application program interface 160 may provide support for industry standard authentication and authorization methods, which may enable identity-managed and policy-controlled auditing for events and access controls. Furthermore, the extensibility of the REST application program interface 160 may enable integration with any suitable existing or future-developed system. For example, in one implementation, the REST interface 160 may be configured with standards such as the Atom Syndication Format and Atom Publishing Protocol to integrate feed synchronization, JavaScript Object Notation and Extensible Markup Language (XML) to integrate enterprise portals, mashups, and social networking platforms. Thus, in the context of feed synchronization to provide automatically notifications in response to any changes to a particular resource 114, a user may simply enter a URI for the resource 114 in an existing web browser feed aggregator (e.g., Firefox bookmarks). Thus, by providing extensible support for any suitable system, application, service, or other resources 114, the features of the REST application program interface 160 may provide agility and interoperability to the infrastructure 110.

Having described the model-driven and service-oriented architecture 100A-B that collectively provide the agile, responsive, reliable, and interoperable environment that enables the features of the workload management system, the description to be provided below will address certain particular features of the workload management system. In addition, further detail relating to the architectural foundation and other features of the workload management system may be provided in "Novell Architectural Foundation: A Technical Vision for Computing and Collaborating with Agility," "Automation for the New Data Center," and "A Blueprint for Better Management from the Desktop to the Data Center," the contents of which are hereby incorporated by reference in their entirety.

Figure 2:
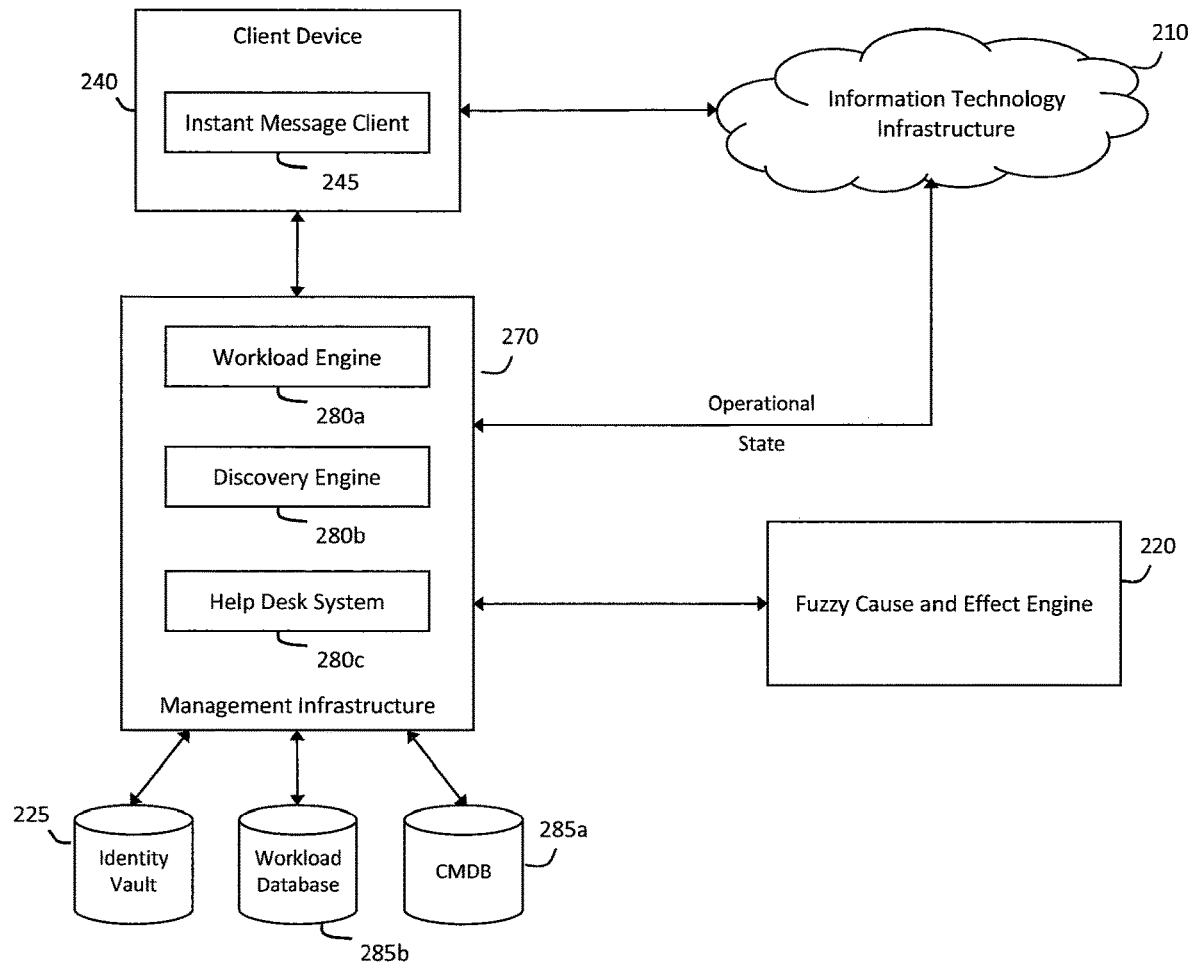
FIG. 2 illustrates an exemplary system that can determine fuzzy cause and effect relationships in the workload management system shown in FIG. 1A and FIG. 1B, according to one aspect of the invention.

According to one aspect of the invention, FIG. 2 illustrates an exemplary system 200 that can determine fuzzy cause and effect relationships in the workload management system shown in FIG. 1A and FIG. 1B. In particular, as described in further detail above, the workload management system may generally provide various services to integrate technologies relating to identity management, policy enforcement, compliance assurance, physical resource management, virtual machines orchestration, virtual team collaboration, and architectural agility, among other things. The workload management system may therefore include a management infrastructure 270 having a workload engine 280a that can dynamically allocate physical resources to host orchestrated virtual machines that run applications and services supporting infrastructure workloads, which may enable a distributed and virtualized data center that can record any suitable collaborative information technology process.

For example, in one implementation, the management infrastructure 270 may be configured to continually monitor an information technology infrastructure 210, including any activity performed at a client device 215 that interacts with the infrastructure 210, and may record streams of events that represent collaborative information technology processes (e.g., within one or more wave data structures that time-order the recorded event streams). In particular, the wave data structures may generally capture or otherwise record any suitable conversational interactions that occur between managed entities in the infrastructure 210, including interactions among various users, physical and virtualized resources, and content associated with the infrastructure 210, among other things. For example, in the context of the collaborative virtual teams described in further detail above, various members of a particular virtual team may be added to a wave data structure and the members of the virtual team may then collaboratively interact with content within the wave data structure, subscribe the data structure to data feeds for resources in the infrastructure 210, communicate with other members of the virtual team, or perform any other suitable information technology process. The information technology processes that occur in the wave data structure may therefore be continually recorded in a time-ordered event stream, which may subsequently be played back to visualize an evolution of the event stream recorded in the wave data structure. Furthermore, where a particular client device 215 or other resource has other suitable data capture mechanisms available (e.g., a camera, screen capture mechanism, microphone, etc.), such mechanisms may be used to record additional information that can enrich the information otherwise captured in the wave data structure.

As such, in one implementation, the management infrastructure 270 may record the time-ordered event streams for any appropriate information technology processes that occur in the infrastructure 210 within the wave data structures, wherein the wave data structures may then be stored in a workload database 285*b*. As such, the wave data structures stored in the workload database 285*b* may subsequently be referenced to remediate, roll back, or otherwise analyze the collaborative information technology processes recorded therein. Furthermore, in one implementation, one or more of the wave data structures stored in the workload database 285*b* may provide time-ordered instruction sequences that can guide subsequent information technology processes that may be relevant to the information recorded in the wave data structures. For example, in one implementation, the wave data structures may implement one or more application program interfaces that enable the wave data structures to be integrated with a suitable application that can replay the wave data structures as a real-time video stream (e.g., Google Wave application program interfaces, as described in "Google Wave API Overview" and "Google Wave Federation Architecture," the contents of which are hereby incorporated by reference in their entirety). In one implementation, the time-ordered event streams recorded in the wave data structures may therefore be replayed in a real-time stream or otherwise referenced to manage collaborative interactions that relate to similar information technology processes recorded in the wave data structures.

For example, as noted above, a common problem that occurs in many information technology infrastructures typically relates to a user experiencing degraded performance for a particular service, which historically would be diagnosed with the user contacting help desk personnel, who then interact with one another to gather information in an attempt to resolve the problem. However, the lack of visibility that existing systems have into the infrastructure may result in the problem not being suitably resolved. In contrast, the system 200 shown in FIG. 2 may include a discovery engine 280*b* that can obtain potential causes and potential effects from the information technology infrastructure 210, the workload database 285*b*, an identity vault 225, a configuration management database 285*a*, or any other suitable source that may provide input information that relates to potential causes and potential effects associated with the information technology infrastructure 210. In one implementation, the management infrastructure 270 may further include (or communicate with) a fuzzy cause and effect engine 220, which may combine the potential causes and effects obtained from various knowledge sources with manual tuning parameters and substantially instantaneous feedback mechanisms that the fuzzy cause and effect engine 220 may use to determine relationships between the potential causes and the potential effects. Thus, as will be described in further detail herein, the fuzzy cause and effect engine 220 may analyze the potential causes, the potential effects, the manual tuning parameters, and any other substantially instantaneous feedback mechanisms or knowledge about the infrastructure 210 to troubleshoot or otherwise manage any suitable problem or other interaction in the information technology infrastructure 210, thereby allowing users, administrators, or other suitable human or automated entities to obtain or provide additional details describing what may be happening in the infrastructure 210 in order to troubleshoot or otherwise manage the infrastructure 210.

In particular, whereas existing systems historically attempt to diagnose or troubleshoot infrastructure problems through interaction between users and help desk personnel with little or no opportunities to leverage knowledge about the infrastructure or other similar diagnostic processes, the system 200 shown in FIG. 2 may enable a user experiencing a problem with a particular service to send a request or other suitable message to a help desk system 280*c* via an instant message client 245. For example, in response to the user experiencing a problem with an e-mail service provided to the client device 240, the request or other message sent via the instant message client 245 may provide various details or other information describing the problem (e.g., "my e-mail has been running really slow"). As such, in response to the help desk system 280*c* receiving the information describing the problem from the instant message client 245 running on the client device 240, an administrator or other suitable personnel at the help desk system 280*c* may obtain information that describes the user, the client device 240, or any other suitable entity associated with the service experiencing the problem (e.g., from the identity vault 225, the configuration management database 285*a*, etc.). In addition, the administrator or other personnel at the help desk system 280*c* may reference any available knowledge sources (e.g., the identity vault 225, the configuration management database 285*a*, the workload database 285*b*, the actual infrastructure 210, etc.) to identify particular resources that may be handling traffic associated with the problematic service (e.g., a web server that handles web traffic associated with the client device 240, an e-mail server that handles e-mail routing and delivery associated with the client device 240, etc.). The help desk personnel may then further invoke the discovery engine 280*b* to determine where and how the client device 240 has been routing through a network associated with the infrastructure 210 to access systems and other resources, and may continue troubleshooting as appropriate to capture any additional information that may be relevant to the problem (e.g., viewing or distilling additional information about the systems or resources that the client device 240 has been accessing, manually tuning certain parameters to capture more or less information, communicating with the instant message client 245 to guide the user through certain diagnostic processes or discuss the problem in more detail with the user, etc.).

Accordingly, the management infrastructure 270 may integrate various input sources that can provide knowledge or enable collaborative interactions to determine cause and effect relationships in the infrastructure and thereby diagnose or manage the infrastructure 210. For example, in one implementation, the integrated input information may be captured from the identity vault 225, the workload database 285*b*, the configuration management database 285*a*, any information that the discovery engine 280*b* may obtain from the infrastructure 210, any information that may be communicated via the instant message client 245, among help desk personnel via similar message clients 245, etc. The integrated input information may therefore detail various potential causes and potential effects that relate to various problems or other interactions in the infrastructure 210 (e.g., among networks, file systems, servers, applications, physical resources, virtualized resources, etc.), which may enable the help desk personnel to make conclusions about the problems and other interactions based on a real-time operational state associated with the infrastructure 210. In one implementation, the information relating to the operational state and the collaborative interactions may be compiled with fuzzy logic that the fuzzy cause and effect engine 220 may use to determine cause and effect relationships that may be referenced to make the conclusions (e.g., the fuzzy cause and effect engine 220 may determine that the problematic service was running slowly because a physical server hosting a web server delivering content to the problematic service also hosts an LDAP database that was recently backed up). In one implementation, the information captured to make the conclusions may be further recorded in a wave data structure, whereby the information and interactions recorded therein may be subsequently referenced to streamline similar diagnostic processes, tune the infrastructure 210, or otherwise determine cause and effect relationships associated with certain problems and interactions (e.g., in response to suitably resolving the problem, the wave data structure may be analyzed to identify any troubleshooting information that was not relevant to making the conclusion and thereby distill the information to capture when handling a subsequent problem having similar characteristics).

Figure 3:
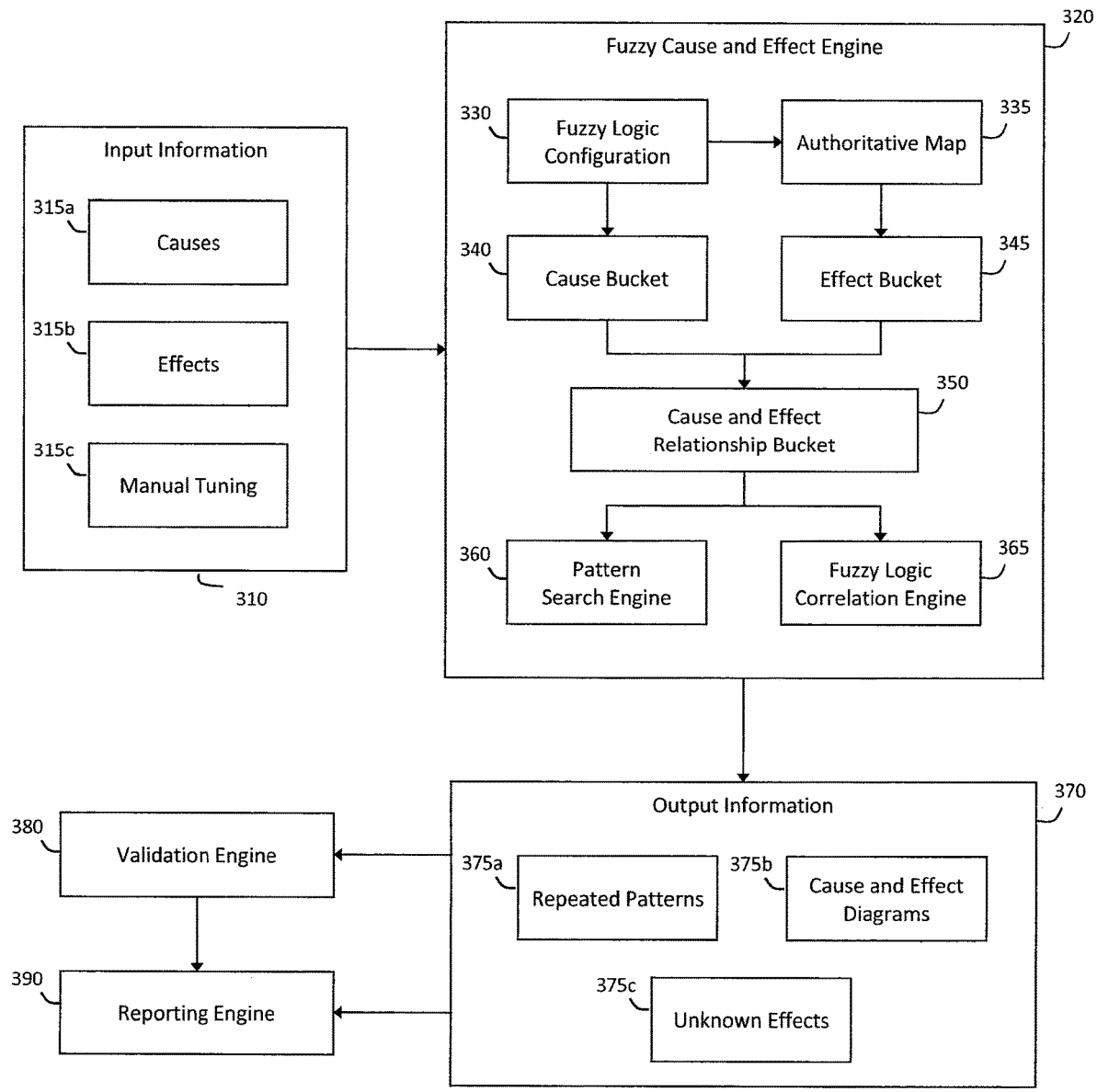
FIG. 3 illustrates an exemplary process flow that may be performed in the system shown in FIG. 2 to determine fuzzy cause and effect relationships in the workload management system, according to one aspect of the invention.

According to one aspect of the invention, FIG. 3 illustrates an exemplary process flow 300 that may be performed in the system shown in FIG. 2 to determine fuzzy cause and effect relationships in the workload management system, wherein the process flow 300 shown in FIG. 3 may generally provide additional details relating to the functionality associated with the fuzzy cause and effect engine 320. In particular, the process flow 300 may include a fuzzy cause and effect engine 320 capturing potential causes 315a and potential effects 315b from various sources that provide input information 310, wherein the fuzzy cause and effect engine 320 may combine the potential causes 315a and the potential effects 315b with manual tuning parameters 315c and any other suitable input knowledge that may provide substantially instantaneous feedback and tracking mechanisms that the fuzzy cause and effect engine 320 may use to determine relationships between the potential causes 315a and the potential effects 315b. For example, as will be described in further detail herein, the fuzzy cause and effect engine 320 may include, among other things, a pattern search engine 360 and a fuzzy logic correlation engine 365 that can apply fuzzy logic and other analytics to determine the relationships between the potential causes 315a and the potential effects 315b, wherein the cause and effect relationships may be used to diagnose problems and otherwise manage interactions in an information technology infrastructure. As such, the fuzzy cause and effect engine 320 may combine the various sources that provide the input information 310 to allow users, administrators, or other human or automated entities to obtain or provide additional details describing an operational state associated with the infrastructure in order to diagnose problems and manage interactions therein. In one implementation, the fuzzy cause and effect engine 320 may therefore employ fuzzy logic to generate true or false calculations that indicate whether any relationships exist among data associated with or captured from the input information 310.

In particular, as noted above, the data associated with or captured from the input information 310 may be broken down into potential causes 315a and potential effects 315a, wherein the fuzzy cause and effect engine 320 may analyze the potential causes 315a and the potential effects 315b to identify relationships among the potential causes 315a and the potential effects 315b. For example, in one implementation, the potential causes 315a may obtained from various applications, products, or other technologies that provide auditing, logging, and account access tracking services (e.g., the Novell Sentinel product, the Novell Privileged User Manager product, the Syslog open source standard, etc.). As such, the various applications, products, or technologies that provide the auditing, logging, and account access tracking services may be used in the workload management system to manage various aspects associated with the infrastructure, wherein any suitable information that may be obtained with such applications, products, or technologies may be tracked and saved to define the potential causes 315a. Furthermore, in one implementation, the potential effects 315b may include information obtained from various applications, products, or other technologies that provide identity services to maintain accounts, roles, policies, authentication credentials, or other identity information associated with the infrastructure, monitoring services that watch active workloads, machines, or other resources associated with the infrastructure, and message services that provide messaging inputs from any suitable source (e.g., e-mail messages, instant messages, text messages, online forms, voice inputs, button or other content interactions, etc.).

As such, any suitable applications, products, or other technologies that provide the identity, monitoring, and messaging services may also be used in the infrastructure, wherein any information that the identity, monitoring, and messaging services obtain may be tracked and saved to define the potential effects 315b. For example, the identity services may provide input information 310 to build the potential effects 315b because the identity services may manage identities associated with the applications, products, or other technologies that provide the auditing, logging, account access tracking, monitoring, and messaging services. Accordingly, the identity services may generally ensure that the fuzzy cause and effect engine 320 will have knowledge describing any identities that the services delivering content in the workload management system may have, whereby the input information 310 used to build the potential causes 315a and the potential effects 315b may be associated with managed identities that the fuzzy cause and effect engine 320 can use to determine relationships between the potential causes 315a and the potential effects 315b. Moreover, in one implementation, the identity services may insert the information describing the managed identities into the input information 310 used to build the potential causes 315a and the potential effects 315b, which may provide a standard mechanism to represent data from various potentially diverse sources that deliver the input information 310 to the fuzzy cause and effect engine 320. As such, having the identity services insert the managed identity information into the input information 310 may enable the fuzzy cause and effect engine 320 to analyze the input information 310 without having to handle individual user names, passwords, authentication credentials, or other identity information otherwise used in the diverse sources that deliver the input information 310.

In one implementation, the fuzzy cause and effect engine 320 may include a fuzzy logic configuration 330 that controls various settings, constraints, and other parameters that configure the fuzzy logic and other analytics that the fuzzy cause and effect engine 320 uses to determine whether any the relationships exist among the potential causes 315a and the potential effects 315b. For example, in one implementation, the fuzzy logic configuration 330 may include one or more time periods to define intervals that control events that the fuzzy cause and effect engine 320 will capture from the potential causes 315a and the potential effects 315b to generate the true or false calculations indicating whether any relationships exist among the events captured from the potential causes 315a and the potential effects 315b. In one implementation, the fuzzy logic configuration 330 may predefine the relevant time periods, or the time periods may be defined in response to invoking the fuzzy cause and effect engine 320 to determine relationships for a particular problem or interaction (e.g., the time periods may be defined based on certain characteristics associated with the problem or interaction that may be recorded in one or more data structures that describe similar problems or interactions). Further, in one implementation, the time periods may be defined in the manual tuning parameters 315c, wherein one or more human or automated entities may increase or decrease the time periods to provide flexibility in determining a time window that may include events relevant to determining relationships for a current problem or interaction that the fuzzy cause and effect engine 320 may be addressing. Additionally, in one implementation, the fuzzy logic configuration 330 may further include information that defines a system associated with the current problem or interaction to provide information that can be referenced to understand how certain components or resources may be affecting one another (e.g., the information that defines the system associated with the current problem or interaction may be derived from a model associated with the infrastructure). In one implementation, the fuzzy logic configuration 330 may further define appropriate sizes or other parameters for a cause bucket 340 and an effect bucket 345 that includes the events captured from the potential causes 315a and the potential effects 315b, as will be described in further detail below.

In one implementation, in response to suitably defining the fuzzy logic configuration 330, the fuzzy cause and effect engine 320 may build an authoritative map 335 that represents the system associated with the current problem or interaction. For example, the authoritative map 335 may generally include various keywords mapped to various categories, services, or other information that suitably represents the system associated with the current problem or interaction (e.g., components, applications, or other resources in the system, relationships, dependencies, or other configurations that may be known for the components, applications, or other resources in the system, etc.). In one implementation, the information in the fuzzy logic configuration 330 that defines the system associated with the current problem or interaction may generally control building the authoritative map 335 from the potential effects 315b, wherein the authoritative map 335 may represent the keywords mapped to the categories or services at any suitable granularity level (e.g., down to levels associated with individual workloads or to higher levels associated with e-mail services that may be composed of multiple workloads). As such, the authoritative map 335 may substantially simplify any complexity in the information that defines the system associated with the current problem or interaction with the granular levels used to represent the keywords mapped to the categories or services.

In one implementation, to build the relationships between the potential causes 315a and the potential effects 315b, the fuzzy cause and effect engine 320 may then populate the cause bucket 340 with the information captured from the potential causes 315a and populate the effect bucket 345 with the information captured from the potential effects 315b. For example, the information used to populate the cause bucket 340 and the effect bucket 345 may be ordered or otherwise organized based on sources that delivered the content used to build the potential causes 315a and the potential effects 315b or time slices associated with the events captured from the potential causes 315a and the potential effects 315b. Alternatively, in one implementation, the information may be ordered or organized based on a combination of the sources that delivered the content, the time slices associated with the events, or any other suitable parameters that can appropriately order or organize the information in a manner that can be used to build the relationships between the potential causes 315a and the potential effects 315b. Furthermore, in one implementation, the fuzzy cause and effect engine 320 may label the information used to populate the effect bucket 345 to describe certain applications, resources, or other components that the potential effects 315b may be affecting in the system. For example, in one implementation, the information in the effect bucket 345 may be labeled with one or more keywords taken from the authoritative map 335, a mechanism that was used to submit one or more messages or other data associated therewith, or any other information that provides additional detail to describe the information in the effect bucket 345. As such, labeling the information in the effect bucket 345 may allow the fuzzy cause and effect engine 320 to make conclusions about any relationships that may be subsequently identified among the information contained in the cause bucket 340 and the effect bucket 345.

In one implementation, in response to suitably populating the cause bucket 340 and the effect bucket 345, the fuzzy cause and effect engine 320 may then build a cause and effect relationship bucket 350 that combines the information in the cause bucket 340 with the information in the effect bucket 345. In particular, the cause and effect relationship bucket 350 may generally combine the information in the cause bucket 340 and the effect bucket 345 in one location, wherein the information combined in the cause and effect relationship bucket 350 may be represented in a common format that the pattern search engine 360 and the fuzzy logic correlation engine 365 can consume to determine the relationships between the potential causes and effects combined therein. Furthermore, because the cause and effect relationship bucket 350 combines the information from the cause bucket 340 and the effect bucket 345 in one location, the cause and effect relationship bucket 350 may provide a repository that any suitable component in the workload management system may interact with to utilize the combined information stored therein. For example, in response to a request to troubleshoot a particular problem or interaction, personnel at a help desk system may view the information in the cause and effect relationship bucket 350 to determine whether to apply any manual tuning parameters 315c to increase or distill the information included therein (e.g., the help desk personnel may increase or decrease the time periods in the fuzzy logic configuration 330 based on whether the cause and effect relationship bucket 350 has small or large amounts of data relating to a particular issue). In another example, the help desk personnel may view multiple sources that provided the input information 310 that was used to build the cause and effect relationship bucket 350 and make manual tunings 315c that relate certain causes 315a and effects 315b (e.g., if many users are all experiencing problems with an e-mail service and the cause and effect relationship bucket 350 includes information detailing a common e-mail server or router that has become unavailable, manual tuning 315c may define a relationship between an effect 315b that represents the problematic e-mail service and a cause 315a that represents the common e-mail server or router becoming unavailable). Thus, combining the information in the cause bucket 340 and the effect bucket 345 in the cause and effect relationship bucket 350 and enabling human personnel to apply manual tunings 315c may provide flexibility over managing correlations that define relationships between causes 315a and effects 315b.

In one implementation, in response to having suitably building the cause and effect relationship bucket 350, the pattern search engine 360 may then analyze the information combined therein to derive one or more patterns that represent what may be happening in the system associated with the current problem or interaction being analyzed in the fuzzy cause and effect engine fuzzy cause and effect engine 320. In particular, the pattern search engine 360 may search the cause and effect relationship bucket 350 based on the information previously used to order or organize the information combined therein (e.g., sources that delivered the information to the fuzzy cause and effect engine 320, time slices associated with the events captured from such sources, labels or keywords used to represent the information or the events contained in the cause and effect relationship bucket 350, etc.). Thus, any common patterns that the pattern search engine 360 identifies among the information combined in the cause and effect relationship bucket 350 may further identify common issues within the system associated with the current problem or interaction. In one implementation, the pattern search engine 360 may use any suitable correlation or pattern-matching techniques to identify the common patterns or issues, as will be apparent (e.g., in response to determining that a poorly performing server has been causing networking problems that drive problems in many other systems, any relationships or other patterns associated with the poorly performing server may be further analyzed to drill down into a particular issue that may be causing the server to perform poorly). Thus, in response to identifying any common patterns or issues, the fuzzy cause and effect engine 320 may create output information 370 to store the common patterns or issues in a repeated patterns 375a bucket.

In one implementation, the fuzzy logic correlation engine 365 may further apply various fuzzy logic algorithms to the information combined in the cause and effect relationship bucket 350 to generate the true or false calculations that indicate whether any relationships exist among the causes 315a and effects 315b represented therein. For example, rather than simply generating binary true or false values, the fuzzy logic algorithms may generate true or false values ranging between zero and one with varying degrees, define membership functions that assign true or false certain value ranges to true or false, or otherwise define functions that map certain input variables to a true or false value that may then be used to generate the true or false calculations indicating whether or not any relationships exist among the causes 315a and effects 315b represented in the cause and effect relationship bucket 350. Although the particular fuzzy logic algorithms that the fuzzy logic correlation engine 365 uses to generate the true or false calculations have been broadly described, any known or subsequently developed fuzzy logic algorithm may be suitably employed, as will be apparent. In one implementation, in response to suitably identifying any relationships among the causes 315a and effects 315b represented in the cause and effect relationship bucket 350, the fuzzy cause and effect engine 320 may create output information 370 that includes one or more cause and effect diagrams 375b that visually represent the relationships. For example, in one implementation, the cause and effect diagrams 375b may include Venn diagrams (or set diagrams) that visually illustrate possible relationships between various causes 315a and effects 315b, wherein the cause and effect diagrams 375b may visually illustrate the true or false calculations that indicate whether any relationships likely exist among the causes 315a and effects 315b included therein.

Furthermore, in one implementation, the fuzzy logic correlation engine 365 may not necessarily identify related causes 315a associated with certain effects 315b, and similarly may not necessarily identify any related effects 315b associated with certain causes 315a. As such, any effects 315b having unknown causes 315a may be stored in an unknown effects buckets 375c, and any causes 315a having unknown effects 315b may be similarly stored in the unknown effects buckets 375c. In one implementation, a validation engine 380 may then launch an interface that provides users with access to the unknown effects bucket 375c, wherein the user may interact with the unknown effects bucket 375c via the validation engine 380 to identify any relationships that may not have been identified with the fuzzy logic correlation engine 365, apply manual tuning parameters 315c to configure the fuzzy logic configuration 330 to capture information from larger data sets, or otherwise apply manual tunings 315c in an effort to identify additional relationships among the events in the unknown effects bucket 375c (e.g., extending time windows to obtain additional causes 315a and effects 315b that may be connected or otherwise related to the events in the unknown effects bucket 375c, determining whether certain settings may be missing a particular source identifier or label that would identify additional potentially related causes 315a and effects 315b, etc.).

In one implementation, the information in the repeated patterns bucket 375a, the cause and effect diagrams 375b, the unknown effects bucket 375c, or any other suitable output information 370 may then be provided to a reporting engine 380. In addition, any additional output information 370 created from the user interacting with the validation engine 380 may be provided to the reporting engine 390. As such, the reporting engine 390 may suitably process the output information 370 to generate one or more reports that represent the data in a manner that can be suitably consumed by administrators, help desk personnel, or other suitable users that may be interested in viewing the data to understand what may be occurring in the system associated with the current problem or interaction.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A method, comprising:
   building maps representing systems, each system associated with an interaction between resources detected within an infrastructure or a problem detected within the infrastructure;
   populating each map with keywords mapped to categories or services and labeled resource information for the corresponding resources;
   maintaining with each map a cause bucket of data comprising logged data, audit data, and access data obtained from tracking services of the infrastructure for the corresponding interaction or the corresponding problem;
   maintaining with each map an effect bucket of data comprising monitored data obtained from monitoring services for the resources and the infrastructure during the corresponding interaction or the corresponding problem;
   deriving with each cause bucket of data and the corresponding effect bucket of data patterns for the corresponding interaction or the corresponding problem using the corresponding keywords mapped to the corresponding categories or mapped to the corresponding services, the corresponding labeled resource information, the corresponding logged data, the corresponding audit data, the corresponding access data, and the corresponding monitored data;
   identifying cause and effect relationships from select patterns that correlate to a state of the infrastructure;
   deriving an additional relationship from the select patterns based at least in part on searching for known relationships of known information; and
   assigning a resource identifier for the corresponding resource associated with the corresponding interaction or the corresponding problem to the additional relationship.

2. The method of claim 1, wherein building further includes detecting collaboration interactions from the interactions, each collaboration interaction associated with two or more of the resources interacting with one another within the infrastructure.

3. The method of claim 2 further comprising, providing an interface for replaying selective ones of the collaborative interactions.

4. The method of claim 1, wherein deriving with each cause bucket of data and the corresponding effect bucket of data further includes identifying cause relationships in the data patterns from application logs retained for applications processing within the infrastructure, wherein first resources of the corresponding resources comprise the applications.

5. The method of claim 4, wherein deriving with each cause bucket of data and the corresponding effect bucket of data further includes identifying effect relationships in the data patterns from the monitored data and from message data provided by messaging services processing within the infrastructure.

6. The method of claim 1, wherein deriving the additional relationship further includes deriving the additional relationship from events captured in the infrastructure that are associated with the data patterns and obtained from the corresponding logged data, the corresponding audit data, the corresponding access data, or the corresponding monitored data.

7. The method of claim 1, wherein assigning further includes obtaining settings for the corresponding resource based on the resource identifier and the corresponding labeled resource information associated with the corresponding resource's map.

8. The method of claim 7, wherein obtaining further includes configuring the corresponding resource with the settings.

9. The method of claim 1, wherein assigning further includes identifying causes and effects associated with corresponding resource based on the additional relationship.

10. The method of claim 9, wherein identifying further includes modifying the corresponding resource addressing at least some of the causes and effects.

11. A method, comprising:
    logging information for interactions of resources within an infrastructure;
    maintaining a map that represents a system for each interaction and associating the corresponding information with the interaction within the map;
    capturing additional information based on monitoring on-going interactions between the resources within the infrastructure;
    updating each map with the corresponding additional information;
    associating events raised within the infrastructure for the interactions and the on-going interactions;
    updating each map with the corresponding events;
    deriving patterns that identify relationships between the resources based on the maps;
    identifying a particular pattern that is a known problem with a particular resource from the patterns; and
    processing one or more actions resolving the known problem with the particular resource, wherein the one or more actions identified from a problem map for the known problem that comprises the particular pattern and the one or more actions.

12. The method of claim 11 further comprising
    providing an interface for inspecting each of the relationships;
    presenting details for a particular relationship when a particular link representing the particular relationship is activated from within the interface.

13. The method of claim 12, wherein providing further includes providing the interface as a Representational State Transfer (REST) interface.

14. The method of claim 12, wherein providing further includes presenting an ecosystem for the infrastructure that can be navigated for inspection of each resource and each relationship between multiple ones of the resources.

15. The method of claim 14 further comprising, rendering a Venn Diagram that visually illustrates for each relationship within the interface.

16. The method of claim 12 further comprising, visually replaying particular interactions associated with the particular pattern within the interface and presenting particular information, particular additional information, and particular events during the replaying.

17. The method of claim 16 further comprising, visually representing an evolution of an event stream associated with the particular events within the interface.

18. A system, comprising:
- at least one processor; and
- executable instructions that execute on the at least one processor;
- wherein the executable instructions configured to:
  - model interactions of an infrastructure that comprises resources as relationships between the resources by maintaining maps for interactions between the resources and for known problems of the infrastructure, each map associated with a given interaction or given known problem, each map comprising keywords mapped to categories or services and labeled resource information for the corresponding resources each map further comprising a cause bucket of data and a effect bucket of data, each cause bucket of data comprises logged data, audit data, and access data obtained from tracking services of the infrastructure for the corresponding given interaction or the corresponding given known problem, each effect bucket of data comprises monitored data obtained from monitoring services for the resources and the infrastructure during the corresponding given interaction or the corresponding given known problem;
  - derive patterns that represent relationships for each given interaction or each given known problem using the corresponding map,
  - identify a problem with at least one resource and at least one relationship based on at least one interaction;
  - resolve the problem using a problem map associated with the problem; and
  - provide an interface to interactively navigate and to visualize the interactions, the resources, and the relationships.

19. The system of claim 18, wherein the executable instructions are further configured to capture events within the cause buckets of data and the effect buckets of data during the interactions.

20. The system of claim 19, wherein the executable instructions are further configured to visually replay select ones of the interactions within the interface from the the events using the cause buckets of data and the effect buckets of data.

* * * * *